US009044861B2

(12) United States Patent
Gomi et al.

(10) Patent No.: US 9,044,861 B2
(45) Date of Patent: Jun. 2, 2015

(54) ROBOT

(71) Applicant: Seiko Epson Corporation, Tokyo (JP)

(72) Inventors: Akihiro Gomi, Fujimi-machi (JP); Masaki Motoyoshi, Shiojiri (JP)

(73) Assignee: Seiko Epson Corporation (JP)

( * ) Notice: Subject to any disclaimer, the term of this patent is extended or adjusted under 35 U.S.C. 154(b) by 76 days.

(21) Appl. No.: 14/013,356

(22) Filed: Aug. 29, 2013

(65) Prior Publication Data

US 2014/0067119 A1 Mar. 6, 2014

(30) Foreign Application Priority Data

Aug. 31, 2012 (JP) .................................. 2012-191452

(51) Int. Cl.
*G05B 19/18* (2006.01)
*B25J 9/16* (2006.01)

(52) U.S. Cl.
CPC .............. *B25J 9/1656* (2013.01); *Y10S 901/09* (2013.01); *B25J 9/1651* (2013.01)

(58) Field of Classification Search
None
See application file for complete search history.

(56) References Cited

U.S. PATENT DOCUMENTS

| 4,705,999 | A | * | 11/1987 | Soji et al. ................. 318/568.18 |
| 5,581,166 | A | * | 12/1996 | Eismann et al. ......... 318/568.22 |
| 5,737,500 | A | * | 4/1998 | Seraji et al. ................... 700/251 |
| 5,781,705 | A | * | 7/1998 | Endo ............................. 700/262 |
| 5,789,890 | A | * | 8/1998 | Genov et al. .................. 318/567 |
| 5,811,951 | A | * | 9/1998 | Young .......................... 318/568.2 |
| 6,023,645 | A | * | 2/2000 | Harima et al. ................. 700/250 |
| 6,121,743 | A | * | 9/2000 | Genov et al. ............. 318/568.11 |
| 7,765,023 | B2 | | 7/2010 | Oaki |
| 8,482,242 | B2 | * | 7/2013 | Nakasugi ....................... 318/689 |
| 2005/0166413 | A1 | * | 8/2005 | Crampton ........................ 33/503 |
| 2005/0246061 | A1 | * | 11/2005 | Oaki et al. ..................... 700/245 |
| 2007/0021870 | A1 | * | 1/2007 | Nagasaka ....................... 700/245 |
| 2007/0288124 | A1 | * | 12/2007 | Nagata et al. ................. 700/258 |
| 2011/0004343 | A1 | * | 1/2011 | Iida ................................ 700/253 |
| 2011/0135437 | A1 | * | 6/2011 | Takeshita et al. ........... 414/744.5 |
| 2012/0010748 | A1 | * | 1/2012 | Sasai ............................. 700/254 |
| 2012/0035763 | A1 | * | 2/2012 | Motoyoshi .................... 700/258 |
| 2012/0215357 | A1 | * | 8/2012 | Igarashi et al. ............... 700/258 |

(Continued)

FOREIGN PATENT DOCUMENTS

| JP | 10-100085 | 4/1998 |
| JP | 2005-242794 | 9/2005 |

(Continued)

*Primary Examiner* — Jonathan L Sample
(74) *Attorney, Agent, or Firm* — Harness, Dickey & Pierce, P.L.C.

(57) ABSTRACT

A robot includes respective arms, respective drive sources, respective angle sensors, respective inertia sensors, a posture detection unit that detects the posture of a third arm, and a second drive source control unit that selects, on the basis of a detection result of the posture detection unit, any one of a second (A) correction component, which is derived from an angular velocity ωA3 of a second axis of a third arm obtained from a third inertia sensor, an angular velocity ωA2m of a second axis of a second arm obtained from a second angle sensor, and an angular velocity ωA3m obtained from a third angle sensor, and a second (B) correction component, which is derived from an angular velocity ωA2 obtained from a second inertia sensor and the angular velocity ωA2m, and feeds back the selected correction component to control the second drive source.

20 Claims, 12 Drawing Sheets

(56) References Cited

U.S. PATENT DOCUMENTS

| | | | |
|---|---|---|---|
| 2012/0215358 A1* | 8/2012 | Gettings et al. | 700/259 |
| 2012/0277912 A1* | 11/2012 | Kirihara | 700/258 |
| 2014/0046483 A1* | 2/2014 | Oaki | 700/253 |
| 2014/0358280 A1* | 12/2014 | Shinozaki | 700/245 |

FOREIGN PATENT DOCUMENTS

| | | |
|---|---|---|
| JP | 2011-042022 | 3/2011 |
| JP | 2012-171051 | 9/2012 |
| JP | 2012-171052 | 9/2012 |
| WO | 2006-022201 | 8/2005 |

* cited by examiner

ROBOT

BACKGROUND

1. Technical Field

The present invention relates to a robot.

2. Related Art

In the related art, a robot having a base and a plurality of arm link portions is known (for example, refer to JP-A-10-100085). Each arm link portion is rotatably coupled to the arm link portion on a base end side via a joint portion, and the arm link portion closest to the base side is rotatably coupled to the base via a joint portion.

In such a robot, the rigidity of the joint portion that couples the base and the arm link portion or the rigidity of the joint portion that couples the arm link portion and the arm link portion is low compared to the base or the arm link portions due to spring elements of the joint portions. Thus, there is a problem in that vibration may be easily generated in the arm link portions due to the rotation of the arm link portions or disturbance applied to the arm link portions.

Thus, in the robot described in JP-A-10-100085, an acceleration sensor is installed at a tip portion of the arm link portion closest to a tip side of the robot, compensation components of the respective joint portions that compensate command values to motors of the respective joint portions so as to suppress the vibration generated at the tip portion of the arm link portion closest to the tip side are calculated on the basis of the acceleration detected by the acceleration sensor, and the calculated compensation components of the respective joint portions are subtracted from the command values of the corresponding respective joint portions.

However, the robot described in JP-A-10-100085 has the following drawbacks.

First, since the acceleration sensor is installed at the tip portion of the arm link portion closest to the tip side, the acceleration detected by the acceleration sensor is converted and corrected into those as the respective joint portions. At this time, since it is necessary to perform coordinate axis transformation referred to as the Jacobi's transformation, and matrix calculation having a number of products of sine and cosine as factors is required, the amount of calculation becomes huge. Since it is necessary to calculate the factors according to the rotation angles of the motors of the respective joint portions that change every moment, it is always necessary to execute huge calculation. Accordingly, there is a drawback in that response speed becomes slow.

Additionally, since accurate acceleration or speed cannot be fed back if calculation precision declines, vibration suppression capability may decline or control performance may be impaired. For this reason, there is a restriction on the design of a control system in that a high-speed computing unit is required, for example.

Additionally, in the calculation of the coordinate axis transformation, there is a region (incalculable region) with no coordinate axis transformation solution referred to as a singular point. In the region, the vibration suppression capability may decline or vibration may be increased instead.

Additionally, for example, even when the posture of an arm link portion varies, such as when the arm link portion is extended and when the arm link portion is folded, the same control is performed. Thus, it is difficult to correctly suppress vibration while stabilizing control.

SUMMARY

An advantage of some aspects of the invention is to provide a robot that can easily and reliably suppress vibration in the robot according to the posture of an arm.

Application Example 1

A robot according to this application example includes a base; a first arm that is coupled to the base and rotates with a first rotation axis as an axial center; a second arm that is coupled to the first arm and rotates with a second rotation axis in a direction different from the first rotation axis as an axial center; a third arm that rotates with a third rotation axis in a direction parallel to the second rotation axis as an axial center; a first drive source that rotates the first arm through a first angular velocity command; a first inertia sensor that is installed at the first arm and detects the angular velocity or acceleration of the first rotation axis of the first arm; a first angle sensor that detects the rotation angle of the first drive source; a second drive source that rotates the second arm through a second angular velocity command; a second inertia sensor that is installed at the second arm and detects the angular velocity or acceleration of the second rotation axis of the second arm; a second angle sensor that detects the rotation angle of the second drive source; a third drive source that rotates the third arm through a third angular velocity command; a third inertia sensor that is installed at the third arm and detects the angular velocity or acceleration of the second rotation axis of the third arm; a third angle sensor that detects the rotation angle of the third drive source; a posture detection unit that detects the posture of the third arm from the second arm as a reference point; a first drive source control unit that feeds back a first correction component, which is derived from an angular velocity $\omega A1$ of the first rotation axis of the first arm obtained from the first inertia sensor and an angular velocity $\omega A1m$ of the first rotation axis of the first arm obtained from the first angle sensor, and controls the first drive source; and a second drive source control unit that selects, on the basis of a detection result of the posture detection unit, any one of a second (A) correction component, which is derived from an angular velocity $\omega A3$ of the second rotation axis of the third arm obtained from the third inertia sensor, an angular velocity $\omega A2m$ of the second rotation axis of the second arm obtained from the second angle sensor, and an angular velocity $\omega A3m$ of the third rotation axis of the third arm obtained from the third angle sensor, and a second (B) correction component, which is derived from an angular velocity $\omega A2$ of the second rotation axis of the second arm obtained from the second inertia sensor and the angular velocity $\omega A2m$, and feeds back the selected correction component to control the second drive source.

Accordingly, the vibration in the robot can be easily and reliably suppressed according to the posture of an arm.

That is, huge calculation is unnecessary, and thereby, response speed in the control of the robot can be increased. Additionally, since calculation in which a singular point is present is unnecessary, the control of the robot can be reliably performed, and vibration can be reliably suppressed.

Particularly, since the second drive source control unit selects, according to the posture of the third arm from the second arm as a reference point, one of a case where the second (A) correction component is fed back to control the second drive source and a case where the second (B) correction component is fed back to control the second drive source, the effect of suppressing vibration can be further optimized, and compatibility with the stability of control can be achieved.

That is, when the vibration component of the second drive source is also included in the vibration component of the third arm depending on the posture of the third arm detected from the second arm as a reference point, the second (A) correction component including the angular velocity obtained from the third inertia sensor installed at the third arm can be fed back to the control of the second drive source, and the effect of suppressing vibration can be enhanced. Additionally, when the vibration component of the second arm is included more than the vibration component of the third arm depending on the posture of the third arm detected from the second arm as a reference point, the second (B) correction component including the angular velocity obtained from the second inertia sensor installed at the second arm is fed back and the control of suppressing vibration is performed, the vibration in the robot can be prevented and control can be stabilized.

Application Example 2

In the robot according to the application example, it is preferable that the robot further includes the first drive source control unit that feeds back the first correction component obtained by multiplying a value, which is obtained by subtracting the angular velocity $\omega A1m$ from the angular velocity $\omega A1$, or a value derived from the obtained value, by a feedback gain, and control the first drive source; and a second drive source control unit that controls the second drive source according to any one of feeding back the second (A) correction component, which is obtained by multiplying a value, which is obtained by subtracting the angular velocity $\omega A2m$ and the angular velocity $\omega A3m$ from the angular velocity $\omega A3$, or a value derived from the obtained value, by a feedback gain, and of feeding back the second (B) correction component, which is obtained by multiplying a value, which is obtained by subtracting the angular velocity $\omega A2m$ from the angular velocity $\omega A2$, or a value derived from the obtained value, by a feedback gain.

Accordingly, the vibration in the robot can be more reliably suppressed according to the posture of the third arm detected from the second arm as a reference point.

Application Example 3

In the robot according to the application example, it is preferable that the robot further includes the posture detection unit that detects the angle $\theta$ formed between an axis of the second arm and an axis of the third arm; and the second drive source control unit that feeds back the second (A) correction component to control the second drive source when the angle $\theta$ is equal to or larger than a first threshold and equal to or smaller than a second threshold that is larger than the first threshold and that feeds back the second (B) correction component to control the second drive source when the angle $\theta$ is larger than the second threshold or smaller than the first threshold.

Accordingly, the compatibility between more reliably enhancing the effect of suppressing vibration and the stability of control according to the posture of the third arm detected from the second arm as a reference point can be achieved.

That is, when the angle $\theta$ formed between the axis of the second arm and the axis of the third arm is equal to or larger than the first threshold and equal to or smaller than the second threshold (extended posture), the control of the robot is stable but the inertia moment of the robot is large and the vibration in the robot is large, compared to a case (folded posture) where the angle $\theta$ formed between the axis of the second arm and the axis of the third arm is smaller than the first threshold or larger than the second threshold. Thus, the effect of suppressing vibration can be enhanced by feeding back the second (A) correction component to control the second drive source.

On the other hand, when the angle $\theta$ formed between the axis of the second arm and the axis of the third arm is smaller than the first threshold or larger than the second threshold, the inertia moment of the robot is small and the vibration in the robot is small but control tends to become unstable and the robot vibrates easily, compared to a case where the angle $\theta$ formed between the axis of the second arm and the axis of the third arm is equal to or larger than the first threshold and equal to or smaller than the second threshold. Thus, the vibration in the robot can be prevented and control can be stabilized, by feeding back the second (B) correction component to control the second drive source.

Application Example 4

In the robot according to the application example, it is preferable that the first threshold is within a range of 60° to 150°, and the second threshold is within a range of 210° to 300°.

Accordingly, the compatibility between more reliably enhancing the effect of suppressing vibration and the stability of control according to the posture of the third arm detected from the second arm as a reference point can be achieved.

Application Example 5

In the robot according to the application example, it is preferable that the robot further includes the second drive source control unit that makes the first threshold large and makes the second threshold small as the mass of an end effector or the mass of the end effector and an object to be gripped by the end effector is larger.

Since the vibration in the robot occurs easily as the mass becomes larger, the vibration can be reliably suppressed according to the mass.

Application Example 6

In robot according to the application example, it is preferable that the robot further includes the second drive source control unit that selects any one of the second (A) correction component and the second (B) correction component by taking into consideration the mass of an end effector or the mass of the end effector and an object to be gripped by the end effector.

Accordingly, the vibration can be reliably suppressed according to the mass.

Application Example 7

In the robot according to the application example, it is preferable that the robot further includes the posture detection unit including the third angle sensor that detects the rotation angle of the third drive source.

Accordingly, the number of parts can be reduced, and configuration can be simplified.

Application Example 8

In the robot according to the application example, it is preferable that the robot further includes the third drive source control unit that feeds back a third correction component, which is derived from an angular velocity $\omega A3$ of the second rotation axis of the third arm obtained from the third inertia sensor, an angular velocity $\omega A2$ of the second rotation axis of the second arm obtained from the second inertia sensor, and an angular velocity $\omega A3m$ of the third rotation axis of the third arm obtained from the third angle sensor, and controls the third drive source.

Accordingly, since the control of suppressing the vibration in the respective arms is performed on the respective arms, the vibration in the robot can be more reliably suppressed.

Application Example 9

In the robot according to the application example, it is preferable that the robot further includes the third drive source control unit that feeds back the third correction component, which is obtained by multiplying a value, which is obtained by subtracting the angular velocity $\omega A2$ and the angular velocity $\omega A3m$ from the angular velocity $\omega A3$, or a value derived from the obtained value, by a feedback gain, and controls the third drive source.

Accordingly, the vibration in the robot can be more reliably suppressed.

Application Example 10

In the robot according to the application examples, it is preferable that the robot further includes the first inertia sensor installed at a tip portion of the first arm, the second inertia sensor installed at a tip portion of the second arm, and the third inertia sensor installed at a tip portion of the third arm.

Accordingly, since the first inertia sensor detects the angular velocity or acceleration of the first arm in a region where the vibration in the first arm is at the maximum, the second inertia sensor detects the angular velocity or acceleration of the second arm in a region where the vibration in the second arm is at the maximum, and the third inertia sensor detects the angular velocity or acceleration of the third arm in a region where the vibration in the third arm is at the maximum, the vibration in the robot can be more reliably suppressed.

Application Example 11

In the robot according to the application example, it is preferable that the robot further includes the second rotation axis that is orthogonal to the first rotation axis or parallel to an axis orthogonal to the first rotation axis.

Accordingly, the robot can be easily controlled.

Application Example 12

A robot according to this application example includes a base; a first arm that is rotatably coupled to the base with a first rotation axis as a rotation center; a second arm that is rotatably coupled to the first arm with a second rotation axis in a direction parallel to the first rotation axis as a rotation center; a first drive source that rotates the first arm through a first angular velocity command; a first inertia sensor that is installed at the first arm and detects the angular velocity or acceleration of the first rotation axis of the first arm; a first angle sensor that detects the rotation angle of the first drive source; a second drive source that rotates the second arm through a second angular velocity command; a second inertia sensor that is installed at the second arm and detects the angular velocity or acceleration of the second rotation axis of the second arm; a second angle sensor that detects the rotation angle of the second drive source; a posture detection unit that detects the posture of the second arm from the first arm as a reference point; and a first drive source control unit that selects, on the basis of a detection result of the posture detection unit, any one of feeding back a first (A) correction component, which is derived from an angular velocity $\omega A2$ of the first rotation axis of the second arm obtained from the second inertia sensor, an angular velocity $\omega A1m$ of the first rotation axis of the first arm obtained from the first angle sensor, and an angular velocity $\omega A2m$ of the second rotation axis of the second arm obtained from the second angle sensor, and controlling the first drive source, and of feeding back a first (B) correction component, which is derived from an angular velocity $\omega A1$ of the first rotation axis of the first arm obtained from the first inertia sensor and an angular velocity $\omega A1m$ of the first rotation axis of the first arm obtained from the first angle sensor, and controlling the first drive source, and performs the selected controlling.

Accordingly, the vibration in the robot can be easily and reliably suppressed according to the posture of an arm.

That is, huge calculation is unnecessary, and thereby, response speed in the control of the robot can be increased. Additionally, since calculation in which a singular point is present is unnecessary, the control of the robot can be reliably performed, and vibration can be reliably suppressed.

Particularly, since the first drive source control unit selects, on the basis of the posture of the second arm detected from the first arm as a reference point, one of a case where the first (A) correction component is fed back to control the first drive source side and a case where the first (B) correction component is fed back to control the first drive source, the compatibility between enhancing the effect of suppressing vibration and the stability of control can be achieved.

That is, when the vibration component of the first drive source is also included in the vibration component of the second arm depending on the posture of the second arm detected from the first arm as a reference point, the first (A) correction component including the angular velocity obtained from the second inertia sensor installed at the second arm can be fed back to the control of the first drive source, and the effect of suppressing vibration can be enhanced. Additionally, when the vibration component of the first arm is included more than the vibration component of the second arm depending on the posture of the second arm detected from the first arm as a reference point, the first (B) correction component including the angular velocity obtained from the first inertia sensor installed at the first arm is fed back and the control of suppressing vibration is performed, the vibration in the robot can be prevented and control can be stabilized.

Application Example 13

In the robot according to the application example, it is preferable that the robot further includes the first drive source control unit that selects, on the basis of a detection result of the posture detection unit, any one of feeding back the first (A) correction component, which is obtained by multiplying a value, which is obtained by subtracting the angular velocity $\omega A1m$ and the angular velocity $\omega A2m$ from the angular velocity $\omega A2$, or a value derived from the obtained value, by a feedback gain, and controlling the first drive source and of feeding back the first (B) correction component, which is obtained by multiplying a value, which is obtained by subtracting the angular velocity $\omega A1m$ from the angular velocity $\omega A1$, or a value derived from the obtained value, by a feedback gain and controlling the first drive source, and performs the selected controlling.

Accordingly, the vibration in the robot can be more reliably suppressed.

Application Example 14

In the robot according to the application example, it is preferable that the robot further includes the posture detection unit that detects the angle θ formed between the axis of the first arm and the axis of the second arm; and a first drive source control unit that feeds back a first (A) correction component, which is derived from an angular velocity ωA2 of the first rotation axis of the second arm obtained from the second inertia sensor, an angular velocity ωA1m of the first rotation axis of the first arm obtained from the first angle sensor, and an angular velocity ωA2m of the second rotation axis of the second arm obtained from the second angle sensor, and controls the first drive source, when the angle θ is equal to or larger than a first threshold and equal to or smaller than a second threshold that is larger than the first threshold, and that feeds back a first (B) correction component, which is derived from an angular velocity ωA1 of the first rotation axis of the first arm obtained from the first inertia sensor and an angular velocity ωA1m of the first rotation axis of the first arm obtained from the first angle sensor, and controls the first drive source when the angle θ is smaller than the first threshold or larger than the second threshold.

Accordingly, the compatibility between more reliably enhancing the effect of suppressing vibration and the stability of control according to the posture of the second arm detected from the first arm as a reference point can be achieved.

That is, when the angle θ formed between the axis of the first arm and the axis of the second arm is equal to or larger than the first threshold and equal to or smaller than the second threshold (extended posture), the control of the robot is stable but the inertia moment of the robot is large and the vibration in the robot is large, compared to a case (folded posture) where the angle θ formed between the axis of the first arm and the axis of the second arm is smaller than the first threshold or larger than the second threshold. Thus, the effect of suppressing vibration can be enhanced by feeding back the first (A) correction component to control the first drive source.

On the other hand, when the angle θ formed between the axis of the first arm and the axis of the second arm is smaller than the first threshold or larger than the second threshold, the inertia moment of the robot is small and the vibration in the robot is small but control tends to become unstable and the robot vibrates easily, compared to a case where the angle θ formed between the axis of the first arm and the axis of the second arm is equal to or larger than the first threshold and equal to or smaller than the second threshold. Thus, the vibration in the robot can be prevented and control can be stabilized, by feeding back the first (B) correction component to control the first drive source.

Application Example 15

In the robot according to the application example, it is preferable that the first threshold is within a range of 60° to 150°, and the second threshold is within a range of 210° to 300°. Accordingly, the compatibility between more reliably enhancing the effect of suppressing vibration and the stability of control according to the posture of the second arm detected from the first arm as a reference point can be achieved.

Application Example 16

In the robot according to the application example, it is preferable that the robot further includes the first drive source control unit that makes the first threshold large and makes the second threshold small as the mass of an end effector or the mass of the end effector and an object to be gripped by the end effector is larger.

Since the robot vibrates easily as the mass is larger, the vibration can be reliably suppressed according to the mass.

Application Example 17

In the robot according to the application example, it is preferable that the robot further includes the first drive source control unit that selects any one of the first (A) correction component and the first (B) correction component by taking into consideration the mass of an end effector or the mass of the end effector and an object to be gripped by the end effector.

Accordingly, the vibration can be reliably suppressed according to the mass.

Application Example 18

In the robot according to the application example, it is preferable that the robot further includes the posture detection unit including the second angle sensor that detects the rotation angle of the second drive source.

Accordingly, the number of parts can be reduced, and configuration can be simplified.

Application Example 19

In the robot according to the application example, it is preferable that the robot further includes the second drive source control unit that feeds back a second correction component, which is derived from an angular velocity ωA2 of the first rotation axis of the second arm obtained from the second inertia sensor, an angular velocity ωA1 of the first rotation axis of the first arm obtained from the first inertia sensor, and an angular velocity ωA2m of the second rotation axis of the second arm obtained from the second angle sensor, and controls the second drive source.

Accordingly, since the control of suppressing the vibration in the respective arms is performed on the respective arms, the vibration in the robot can be more reliably suppressed.

Application Example 20

In the robot according to the application example, it is preferable that the robot further includes the second drive source control unit that feeds back the second correction component, which is obtained by multiplying a value, which is obtained by subtracting the angular velocity ωA1 and the angular velocity ωA2m from the angular velocity ωA2, or a value derived from the obtained value, by a feedback gain, and controls the second drive source.

Accordingly, the vibration in the robot can be more reliably suppressed.

Application Example 21

In the robot according to the application example, it is preferable that the robot further includes the first inertia sensor installed at a tip portion of the first arm; and the second inertia sensor installed at a tip portion of the second arm.

Accordingly, since the first inertia sensor detects the angular velocity or acceleration of the first arm in a region where the vibration in the first arm is at the maximum and the second inertia sensor detects the angular velocity or acceleration of the second arm in a region where the vibration in the second arm is at the maximum, the vibration in the robot can be more reliably suppressed.

Application Example 22

In the robot according to the application example, it is preferable that the first rotation axis coincides with the normal line of an installation surface of the base.

Accordingly, the robot can be easily controlled.

BRIEF DESCRIPTION OF THE DRAWINGS

The invention will be described with reference to the accompanying drawings, wherein like numbers reference like elements.

DESCRIPTION OF EXEMPLARY EMBODIMENTS

A robot of the invention will be described below in detail on the basis of preferred embodiments shown in the accompanying drawings.

First Embodiment

Figure 1:
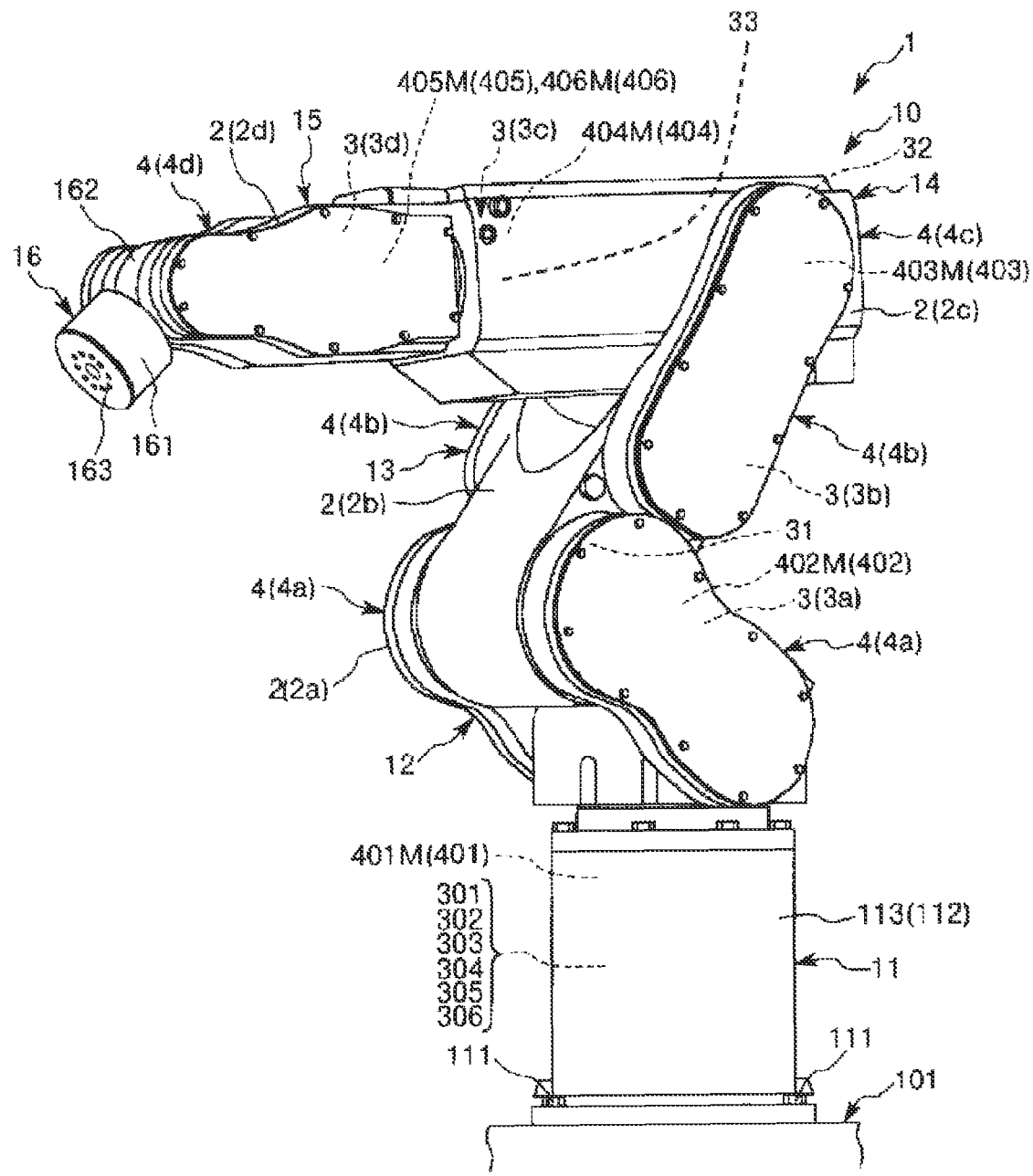
FIG. 1 is the perspective view when a first embodiment of a robot of the invention is viewed from the front side.
Figure 2:
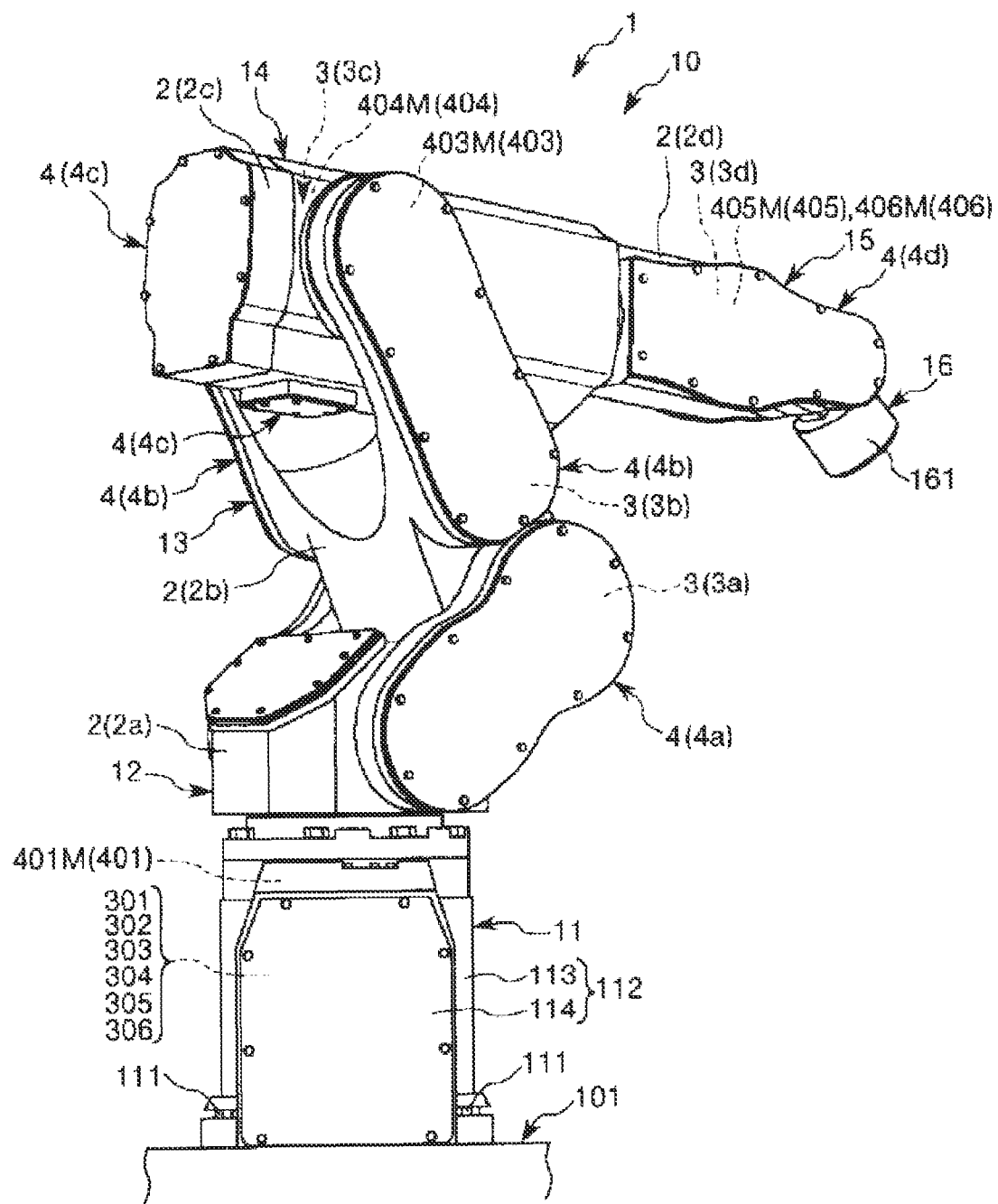
FIG. 2 is a perspective view when the robot shown in FIG. 1 is viewed from the back side.
Figure 3:
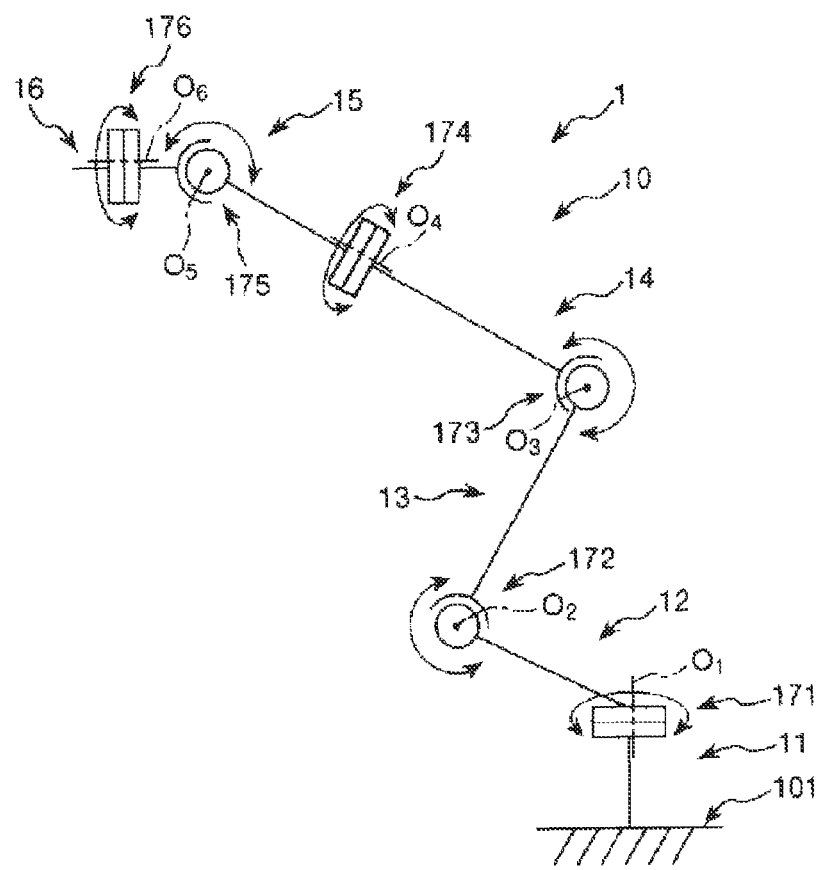
FIG. 3 is a schematic view of the robot shown in FIG. 1.
Figure 4:
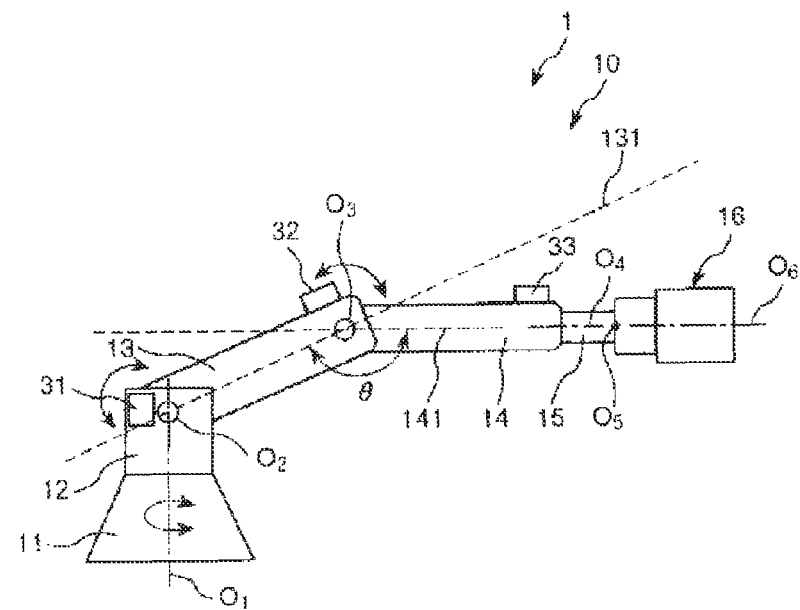
FIG. 4 is a schematic view of the robot shown in FIG. 1.
Figure 5:
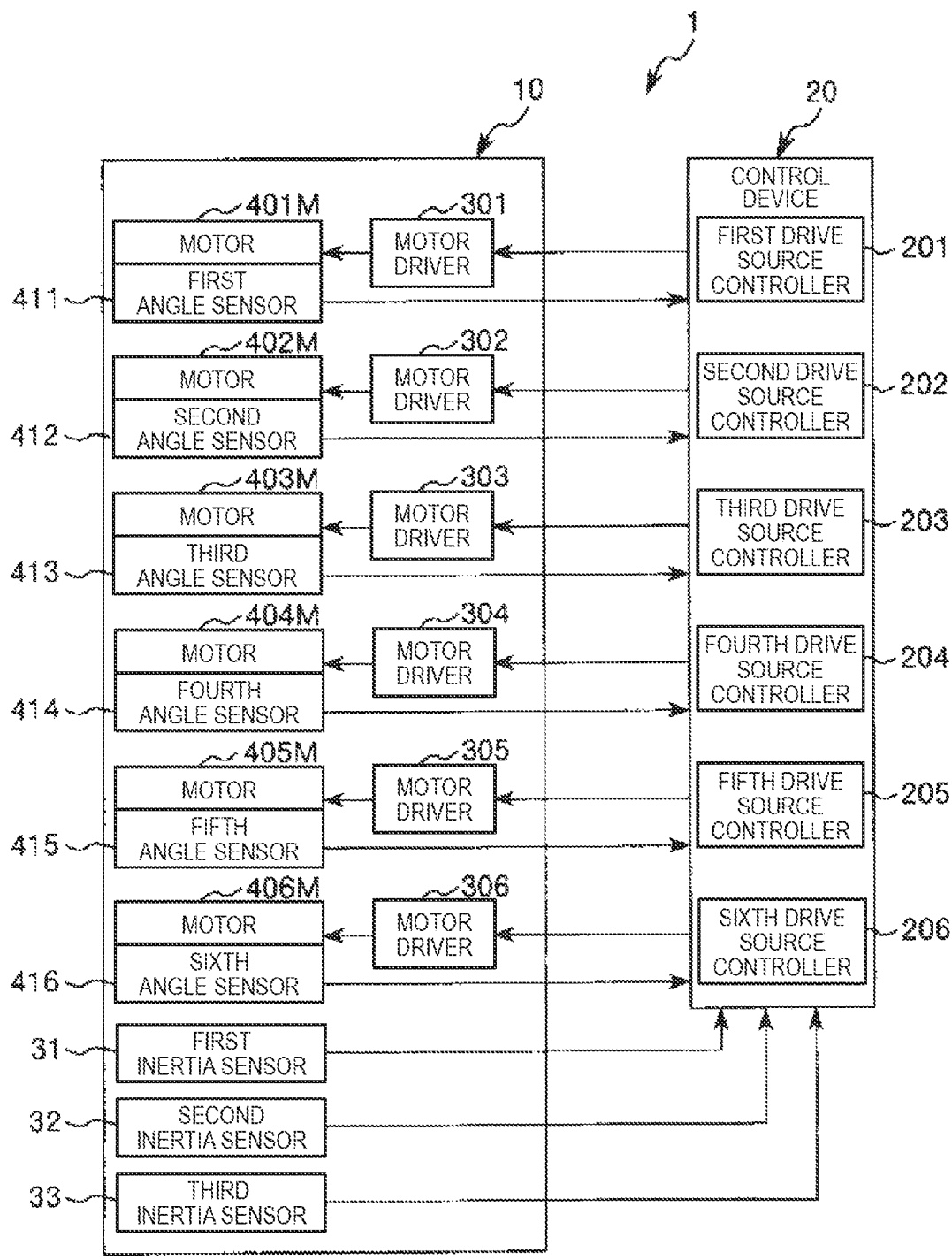
FIG. 5 is a block diagram of main portions of the robot shown in FIG. 1.

FIG. 1 is the perspective view when a first embodiment of a robot of the invention is viewed from the front side. FIG. 2 is a perspective view when the robot shown in FIG. 1 is viewed from the back side. FIGS. 3 and 4 are schematic views of the robot shown in FIG. 1, respectively. FIG. 5 is a block diagram of main portions of the robot shown in FIG. 1. FIGS. 6 to 10 are block diagrams of the main portions of the robot shown in FIG. 1, respectively. FIG. 11 is a flowchart showing the control operation of a control device of the robot shown in FIG. 1.

In addition, in the following, for the convenience of description, the upper side in FIGS. 1 to 4 and FIG. 6 is referred to as "upper" or "upside" and the lower side is referred to as "lower" or "downside". Additionally, the base side in FIGS. 1 to 4 and FIG. 6 is referred to as a "base end", and the opposite side is referred to as a "tip". Additionally, the rotation axes O2 and O3 are shown in an exaggerated manner in FIG. 4, respectively. Additionally, inertia sensors 31, 32, and 33 are shown outside arms 12, 13, 14 in FIG. 4, respectively, in order to clarify the presence of the sensors.

A robot (industrial robot) 1 shown in FIGS. 1 to 4 can be used for, for example, a manufacturing process that manufactures precision mechanical equipment, such as a wrist watch, and has a robot body 10 and a control device (control unit) 20 (refer to FIG. 5) that controls the operation of the robot body 10. The robot body 10 and the control device 20 are electrically connected. Additionally, the control device 20 can be constituted by, for example, personal computers (PC) in which a central processing unit (CPU) is built. In addition, the control device 20 will be described below in more detail.

The robot body 10 includes a base 11, four arms (links) 12, 13, 14, and 15, a wrist (link) 16, and six drive sources 401, 402, 403, 404, 405, and 406. The robot body 10 is a vertical multi-joint (six-axis) robot (robot body) in which the base 11, the arms 12, 13, 14, and 15, and the wrist 16 are coupled together in the order from a base end side toward a tip side. In the vertical multi-joint robot, the base 11, the arms 12 to 15, and the wrist 16 can also be collectively referred to as "arms", and the arm 12, the arm 13, the arm 14, the arm 15, and the wrist 16 can be referred to as a "first arm", a "second arm", a "third arm", a "fourth arm", and a "fifth or sixth arm", respectively. In addition, the wrist 16 may have the fifth arm and the sixth arm. An end effector or the like can be attached to the wrist 16.

As shown in FIGS. 3 and 4, the arms 12 to 15 and the wrist 16 are supported so as to be independently displaceable with respect to the base 11. The lengths of the arms 12 to 15 and the wrist 16 are not particularly limited, respectively. However, in the illustrated configuration, the lengths of the arms 12 to 14 are set to be larger than those of the other arm 15 and the wrist 16. In addition, for example, the length of the third arm 14 is made smaller than the lengths of the first arm 12 and the second arm 13.

The base 11 and the first arm 12 are coupled together via a joint 171. The first arm 12 has a first rotation axis O1 parallel to the vertical direction as a rotation center, and is rotatable with respect to the base 11 around the first rotation axis O1. The first rotation axis O1 coincides with the normal line of an upper surface of a floor 101 that is an installation surface of the base 11. The rotation around the first rotation axis O1 is performed by the driving of the first drive source 401. Additionally, the first drive source 401 is driven by a motor 401M and a cable (not shown), and the motor 401M is controlled by the control device 20 via a motor driver 301 that is electrically connected thereto (refer to FIG. 5). The driving from the motor 401M may be transmitted to the first drive source 401 by a speed reducer (not shown) provided together with the motor 401M, and the speed reducer may be omitted.

The first arm 12 and the second arm 13 are coupled together via a joint 172. The second arm 13 is rotatable with respect to the first arm 12 with the second rotation axis O2 parallel to the horizontal direction as an axial center. The second rotation axis O2 is orthogonal to the first rotation axis O1. The rotation around the second rotation axis O2 is performed by the driving of the second drive source 402. Additionally, the second drive source 402 is driven by a motor 402M and a cable (not shown), and the motor 402M is controlled by the control device 20 via a motor driver 302 that is electrically connected thereto (refer to FIG. 5). The driving from the motor 402M may be transmitted to the second drive source 402 by a speed reducer (not shown) provided in addition to the motor 402M, and the speed reducer may be omitted. In addition, the second rotation axis O2 may be parallel to an axis orthogonal to the first rotation axis O1.

The second arm 13 and the third arm 14 are coupled together via a joint 173. The third arm 14 has a rotation axis O3 parallel to the horizontal direction as a rotation center, and is rotatable with respect to the second arm 13 around the third rotation axis O3. The third rotation axis O3 is parallel to the second rotation axis O2. The rotation around the third rotation axis O3 is performed by the driving of the third drive source 403. Additionally, the third drive source 403 is driven by a motor 403M and a cable (not shown), and the motor 403M is controlled by the control device 20 via a motor driver 303 that is electrically connected thereto (refer to FIG. 5). The driving from the motor 403M may be transmitted to the third drive source 403 by a speed reducer (not shown) provided in addition to the motor 403M, and the speed reducer may be omitted.

The third arm 14 and the fourth arm 15 are coupled together via a joint 174. The fourth arm 15 has a fourth rotation axis O4 parallel to the direction of a central axis of the third arm 14 as a rotation center, and is rotatable with respect to the third arm 14 (base 11) around the fourth rotation axis O4. The fourth rotation axis O4 is orthogonal to the third rotation axis O3. The rotation around the fourth rotation axis O4 is performed by the driving of the fourth drive source 404. Additionally, the fourth drive source 404 is driven by a motor 404M and a cable (not shown), and the motor 404M is controlled by the control device 20 via a motor driver 304 that is electrically connected thereto (refer to FIG. 5). The driving from the motor 404M may be transmitted to the fourth drive source 404 by a speed reducer (not shown) provided together with the motor 404M, and the speed reducer may be omitted. In addition, the fourth rotation axis O4 may be parallel to an axis orthogonal to the third rotation axis O3.

The fourth arm 15 and the wrist 16 are coupled together via a joint 175. The wrist 16 has a fifth rotation axis O5 parallel to the horizontal direction (y-axis direction) as a rotation center, and is rotatable with respect to the fourth arm 15 around the fifth rotation axis O5. The fifth rotation axis O5 is orthogonal to the fourth rotation axis O4. The rotation around the fifth rotation axis O5 is performed by the driving of the fifth drive source 405. Additionally, the fifth drive source 405 is driven by a motor 405M and a cable (not shown), and the motor 405M is controlled by the control device 20 via a motor driver 305 that is electrically connected thereto (refer to FIG. 5). The driving from the motor 405M may be transmitted to the fifth drive source 405 by a speed reducer (not shown) provided together with the motor 405M, and the speed reducer may be omitted. Additionally, the wrist 16 has a sixth rotation axis O6 vertical to the fifth rotation axis O5 as a rotation center, and is also rotatable via a joint 176 around the sixth rotation axis O6. The rotation axis O6 is orthogonal to the rotation axis O5. The rotation around the sixth rotation axis O6 is performed by the driving of the sixth drive source 406. Additionally, the sixth drive source 406 is driven by a motor 406M and a cable (not shown), and the motor 406M is controlled by the control device 20 via a motor driver 306 that is electrically connected thereto (refer to FIG. 5). The driving from the motor 406M may be transmitted to the sixth drive source 406 by a speed reducer (not shown) provided in addition to the motor 406M, and the speed reducer may be omitted. In addition, the fifth rotation axis O5 may be parallel to an axis orthogonal to the fourth rotation axis O4, and the sixth rotation axis O6 may be parallel to an axis orthogonal to the fifth rotation axis O5.

Additionally, the first inertia sensor 31 is installed at the first arm 12. The first inertia sensor 31 detects the angular velocity of the first arm 12 around the first rotation axis O1. Although the installation position of the first inertia sensor 31 at the first arm 12 is not particularly limited, a tip portion of the first arm 12 is preferable. In the present embodiment, the first inertia sensor 31 is installed at the tip portion inside the first arm 12. Since the vibration in the first arm 12 becomes the maximum at the tip portion of the first arm, this can more reliably suppress the vibration in the robot 1. In addition, it is obvious that the first inertia sensor 31 may be installed at a base end portion of the first arm 12.

Additionally, a second inertia sensor 32 is installed at the second arm 13. The second inertia sensor 32 detects the angular velocity of the second arm 13 around the second rotation axis O2. Although the installation position of the second inertia sensor 32 at the second arm 13 is not particularly limited, a tip portion of the second arm 13 is preferable. In the present embodiment, the second inertia sensor 32 is installed at the tip portion inside the second arm 13. Since the vibration in the second arm 13 becomes the maximum at the tip portion of the second arm, this can more reliably suppress the vibration in the robot 1. In addition, it is obvious that the second inertia sensor 32 may be installed at a base end portion of the second arm 13.

Additionally, a third inertia sensor 33 is installed at the third arm 14. The third inertia sensor 33 detects the angular velocity of the third arm 14 around the second rotation axis O2. Although the installation position of the third inertia sensor 33 at the third arm 14 is not particularly limited, a tip portion of the third arm 14 is preferable. In the present embodiment, the third inertia sensor 33 is installed at the tip portion inside the third arm 14. Since the vibration in the third arm 14 becomes the maximum at the tip portion of the third arm 14, this can more reliably suppress the vibration in the robot 1. In addition, it is obvious that the third inertia sensor 33 may be installed at a base end portion of the third arm 14.

Additionally, the first inertia sensor 31, the second inertia sensor 32, and the third inertia sensor 33 are not particularly limited, respectively, and in the present embodiment, for example, a gyroscope sensor, an acceleration sensor, or the like can be used.

Here, in the robot 1, in order to suppress the vibration in the first arm 12, the second arm 13, and the third arm 14, the first inertia sensor 31, the second inertia sensor 32, and the third inertia sensor 33 are installed at all the first arm 12, the second arm 13, and the third arm 14 as mentioned above, and the operation of the drive sources 401, 402, and 403 is controlled on the basis of detection results of the first inertia sensor 31, the second inertia sensor 32, and the third inertia sensor 33. Accordingly, the vibration in the first arm 12, the second arm 13, and the third arm 14 can be reliably suppressed, and thereby, the vibration in the whole robot 1 can be suppressed.

A first angle sensor 411, a second angle sensor 412, a third angle sensor 413, a fourth angle sensor 414, a fifth angle sensor 415, and a sixth angle sensor 416 are provided at respective motors or speed reducers in the drive sources 401 to 406. Encoders, rotary encoders, or the like can be used as the angle sensors. The angle sensors 411 to 416 detect the rotation angles of rotating shafts of the motors or speed reducers of the drive sources 401 to 406, respectively. The motors of the drive sources 401 to 406 are not particularly limited, respectively. For example, it is preferable to use servo motors, such as AC servo motors or DC servo motors. Additionally, the respective cables may be inserted through the robot body 10, respectively.

As shown in FIG. 5, the robot body 10 is electrically connected to the control device 20. That is, the drive sources 401 to 406, the angle sensors 411 to 416, and the inertia sensors 31, 32, and 33 are electrically connected to the control device 20, respectively.

The control device 20 can independently operate the arms 12 to 15 and the wrist 16, respectively, that is, can independently control the drive sources 401 to 406 via the motor drivers 301 to 306, respectively. In the case, the control device 20 performs detection by the angle sensors 411 to 416, the first inertia sensor 31, the second inertia sensor 32, and the third inertia sensor 33 and controls the driving, for example, angular velocity, rotation angle, or the like of the drive sources 401 to 406 on the basis of the detection results, respectively. A control program is stored in advance in a recording medium built in the control device 20.

As shown in FIGS. 1 and 2, when the robot 1 is a vertical multi-joint robot, the base 11 is a portion that is located on the lowermost side of the vertical multi-joint robot and is fixed to the floor 101 of an installation space. The fixing method is not particularly limited, and for example, in the present embodiment shown in FIGS. 1 and 2, a fixing method using a plurality of bolts 111 is used. In addition, a fixing place in the installation space of the base 11 can also be the wall or ceiling of the installation space other than the floor.

The base 11 has a hollow base body (housing) 112. The base body 112 can be separated into a cylindrical portion 113 that forms a cylindrical shape, and a box-shaped portion 114 that is integrally formed at an outer peripheral portion of the cylindrical portion 113 and forms a box shape. For example, the motor 401M and the motor drivers 301 to 306 are stored in such a base body 112.

The arms 12 to 15 have a hollow arm body 2, a drive mechanism 3, and a sealing unit 4, respectively. In addition, in the following, for the convenience of description, the arm body 2, the drive mechanism 3, and the sealing unit 4 of the first arm 12 may be referred to as an "arm body $2a$", a "drive mechanism $3a$", and a "sealing unit $4a$", respectively, the arm body 2, the drive mechanism 3, and the sealing unit 4 of the second arm 13 may be referred to as an "arm body $2b$", a "drive mechanism $3b$", and a "sealing unit $4b$", respectively, the arm body 2, the drive mechanism 3, and the sealing unit 4 of the third arm 14 may be referred to as an "arm body $2c$", a "drive mechanism $3c$", and a "sealing unit $4c$", respectively, and the arm body 2, the drive mechanism 3, and the sealing unit 4 of the fourth arm 15 may be referred to as an "arm body $2d$", a "drive mechanism $3d$", and a "sealing unit $4d$", respectively.

Additionally, the joints 171 to 176 have rotation support mechanisms (not shown), respectively. The rotation support mechanisms are a mechanism that supports one of two arms coupled to each other so as to be rotatable to the other, a mechanism that supports one of the base 11 and the first arm 12 coupled to each other so as to be rotatable to the other, and a mechanism that supports one of the fourth arm 15 and the wrist 16 coupled to each other so as to be rotatable to the other. When the fourth arm 15 and the wrist 16 coupled to each other are taken as an example, the rotation support mechanism can rotate the wrist 16 with respect to the fourth arm 15. Additionally, each rotation support mechanism has a speed reducer (not shown) that reduces the rotating speed of a corresponding motor in a predetermined reduction ratio, and transmits the driving force thereof to a corresponding arm, the wrist body 161 of the wrist 16, and a support ring 162.

The first arm 12 is coupled to an upper end portion (tip portion) of the base 11 in a posture in which the first arm 12 inclines with respect to the horizontal direction. In the first arm 12, the drive mechanism $3a$ has the motor 402M, and is stored within the arm body $2a$. Additionally, the inside of the arm body $2a$ is hermetically sealed by the sealing unit $4a$.

The second arm 13 is coupled to a tip portion of the first arm 12. In the second arm 13, the drive mechanism $3b$ has the motor 403M, and is stored within the arm body $2b$. Additionally, the inside of the arm body $2b$ is hermetically sealed by the sealing unit $4b$.

The third arm 14 is coupled to a tip portion of the second arm 13. In the third arm 14, the drive mechanism $3c$ has the motor 404M, and is stored within the arm body $2c$. Additionally, the inside of the arm body $2c$ is hermetically sealed by the sealing unit $4c$.

The fourth arm 15 is coupled to a tip portion of the third arm 14 in parallel with the direction of a central axis thereof. In the arm 15, the drive mechanism $3d$ has the motors 405M and 406M, and is stored within the arm body $2d$. Additionally, the inside of the arm body $2d$ is hermetically sealed by the sealing unit $4d$.

The wrist 16 is coupled to a tip portion (end portion opposite the base 11) of the fourth arm 15. For example, a manipulator (not shown) that grips precision mechanical equipment, such as a wrist watch, is detachably mounted on a tip portion (an end portion opposite the fourth arm 15) of the wrist 16, as a functional portion (end effector). In addition, the manipulator is not particularly limited, and includes, for example, a manipulator of a configuration having a plurality of fingers. The robot 1 can convey the precision mechanical equipment by controlling the operation of the arms 12 to 15, the wrist 16, or the like with the precision mechanical equipment gripped by the manipulator.

The wrist 16 has the wrist body (sixth arm) 161 that forms a cylindrical shape, and the support ring (fifth arm) 162 that is configured separately from the wrist body 161, is provided at a base end portion of the wrist body 161, and forms a ring shape.

A tip face 163 of the wrist body 161 is a flat surface, and serves as a mounting surface on which the manipulator is mounted. Additionally, the wrist body 161 is coupled to the drive mechanism $3d$ of the fourth arm 15 via the joint 176, and is rotated around the rotation axis O6 by the driving of the motor 406M of the drive mechanism $3d$.

The support ring 162 is coupled to the drive mechanism $3d$ of the fourth arm 15 via the joint 175, and is rotated around the rotation axis O5 of the whole wrist body 161 by the driving of the motor 405M of the drive mechanism $3d$.

Next, the configuration of the control device 20 will be described with reference to FIGS. 5 and 6 to 10.

As shown in FIGS. 5 and 6 to 10, the control device 20 has a first drive source controller (first drive source control unit) (first angular velocity command) 201 that controls the operation of the first drive source 401, a second drive source controller (second drive source control unit) (second angular velocity command) 202 that controls the operation of the second drive source 402, a third drive source controller (third drive source control unit) (third angular velocity command) 203 that controls the operation of the third drive source 403, a fourth drive source controller (fourth drive source control unit) (fourth angular velocity command) 204 that controls the operation of the fourth drive source 404, a fifth drive source controller (fifth drive source control unit) (fifth angular velocity command) 205 that controls the operation of the fifth drive source 405, and a sixth drive source controller (sixth drive source control unit) (sixth angular velocity command) 206 that controls the operation of the sixth drive source 406.

Figure 6:
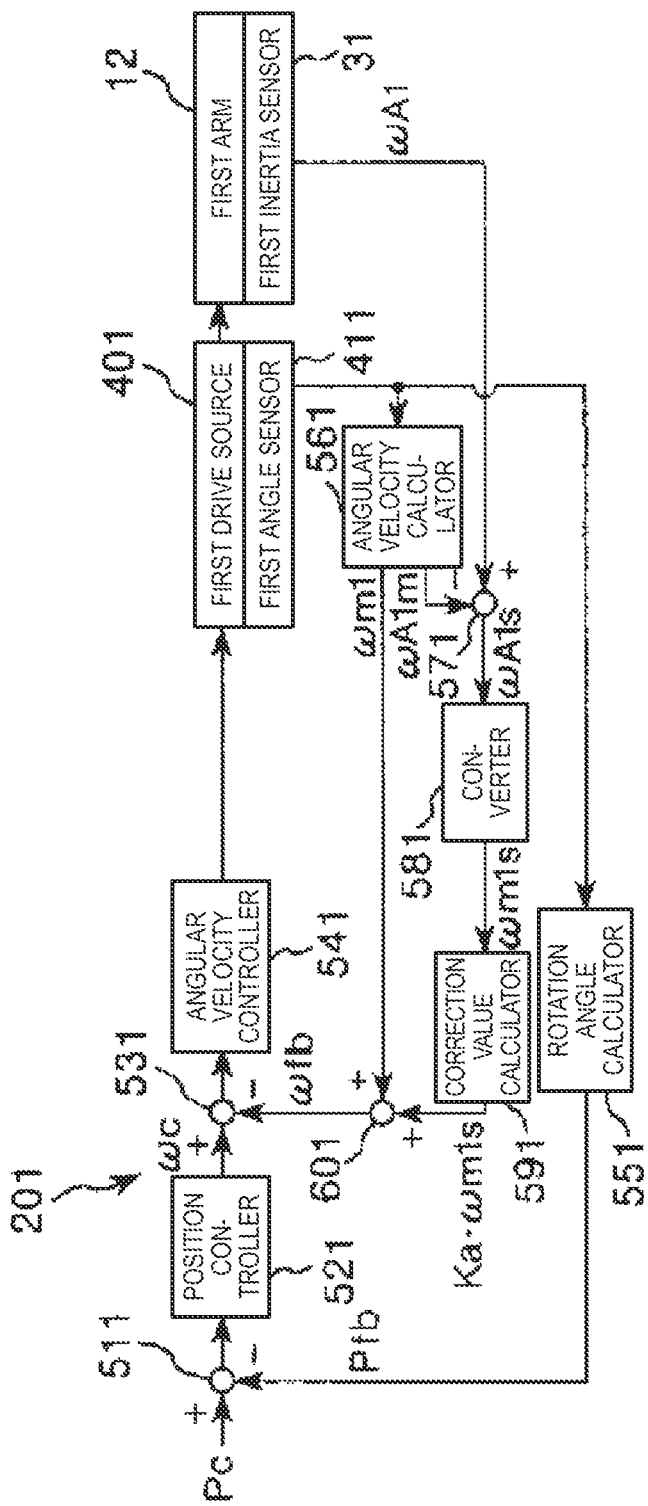
FIG. 6 is a block diagram of main portions of the robot shown in FIG. 1.

As shown in FIG. 6, the first drive source controller 201 has a subtractor 511, a position controller 521, a subtractor 531, an angular velocity controller 541, a rotation angle calculator 551, an angular velocity calculator 561, a subtractor 571, a converter 581, a correction value calculator 591, and an adder 601.

Figure 7:
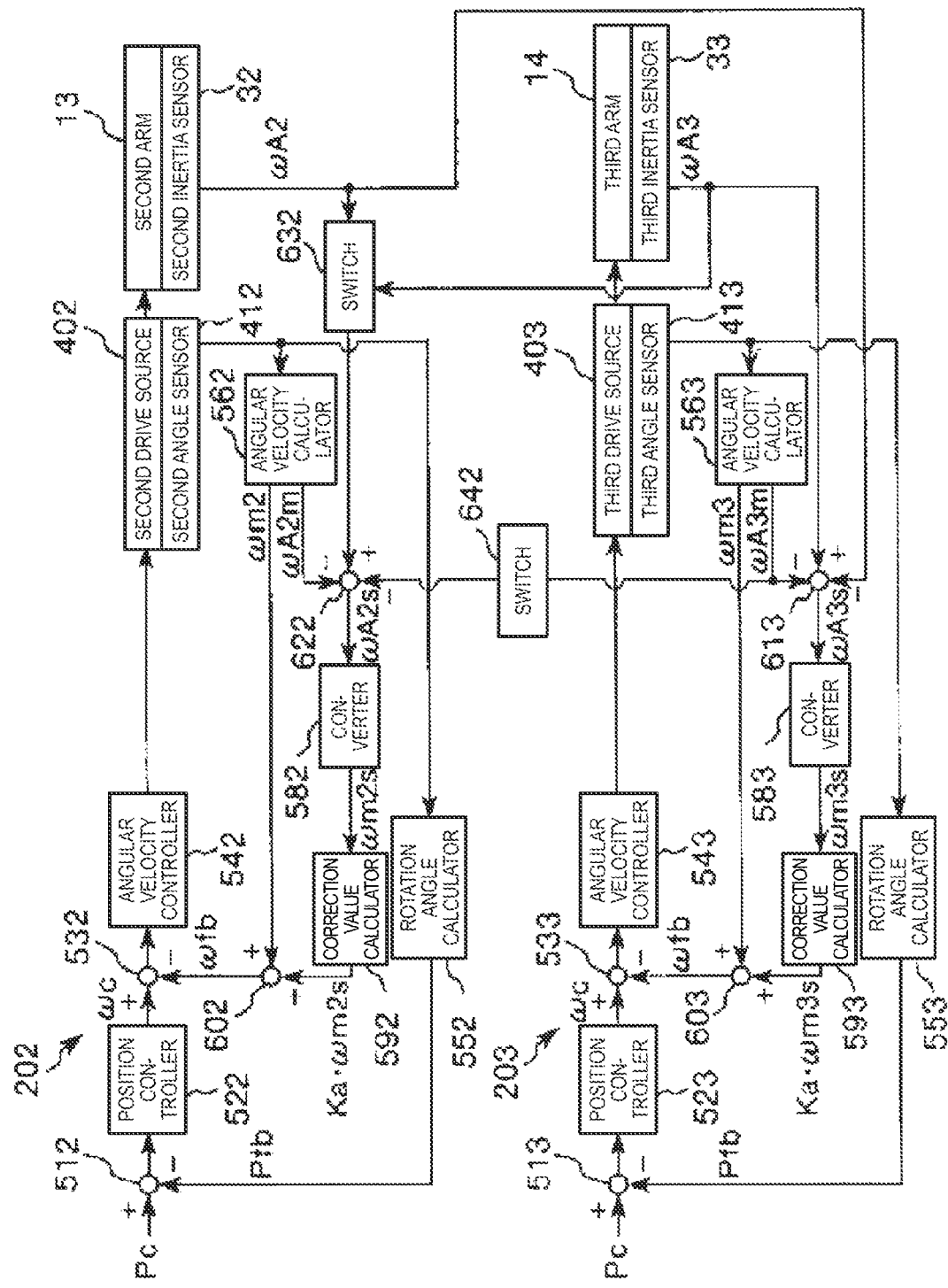
FIG. 7 is a block diagram of main portions of the robot shown in FIG. 1.

As shown in FIG. 7, the second drive source controller 202 has a subtractor 512, a position controller 522, a subtractor 532, an angular velocity controller 542, a rotation angle calculator 552, an angular velocity calculator 562, an adder-subtractor 622, a converter 582, a correction value calculator 592, an adder 602, and switches 632 and 642. In addition, the switch 632 selects any one of an angular velocity ωA2 and an angular velocity ωA3 to be described below, and outputs the selected angular velocity to the adder-subtractor 622. Additionally, the switch 642 switches between a case where an angular velocity ωA3m to be described below is output to the adder-subtractor 622 and a case where the angular velocity ωA3m is not output to the adder-subtractor 622.

As shown in FIG. 7, the third drive source controller 203 has a subtractor 513, a position controller 523, a subtractor 533, an angular velocity controller 543, a rotation angle calculator 553, an angular velocity calculator 563, an adder-subtractor 613, a converter 583, a correction value calculator 593, and an adder 603.

Figure 8:
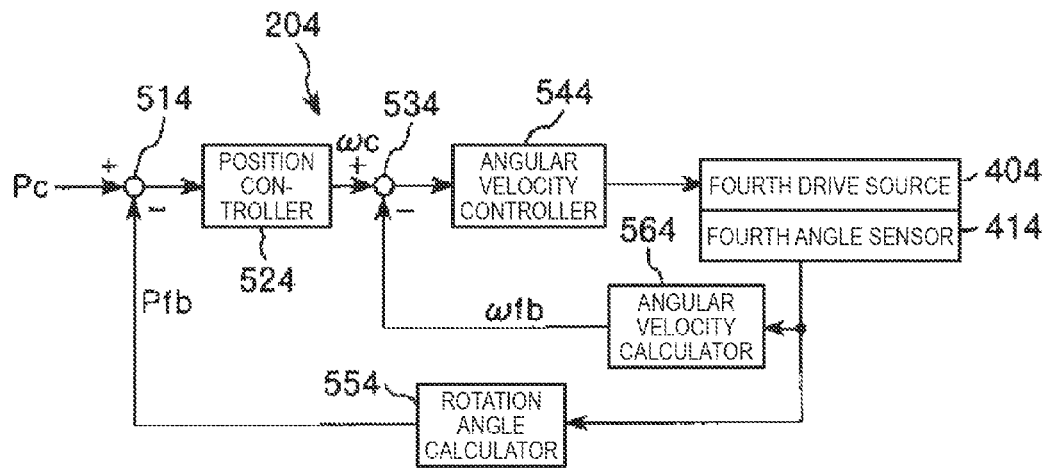
FIG. 8 is a block diagram of main portions of the robot shown in FIG. 1.

As shown in FIG. 8, the fourth drive source controller 204 has a subtractor 514, a position controller 524, a subtractor 534, an angular velocity controller 544, a rotation angle calculator 554, and an angular velocity calculator 564.

Figure 9:
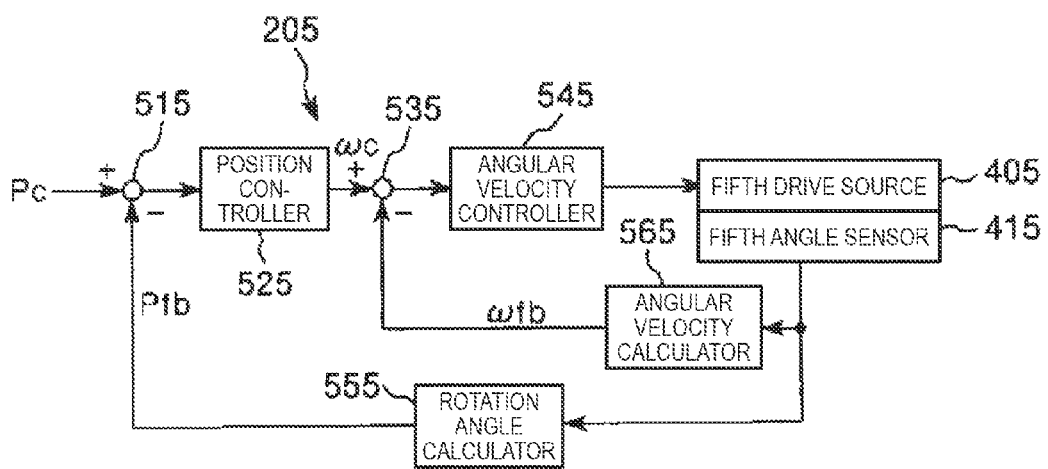
FIG. 9 is a block diagram of main portions of the robot shown in FIG. 1.

As shown in FIG. 9, the fifth drive source controller 205 has a subtractor 515, a position controller 525, a subtractor 535, an angular velocity controller 545, a rotation angle calculator 555, and an angular velocity calculator 565.

Figure 10:
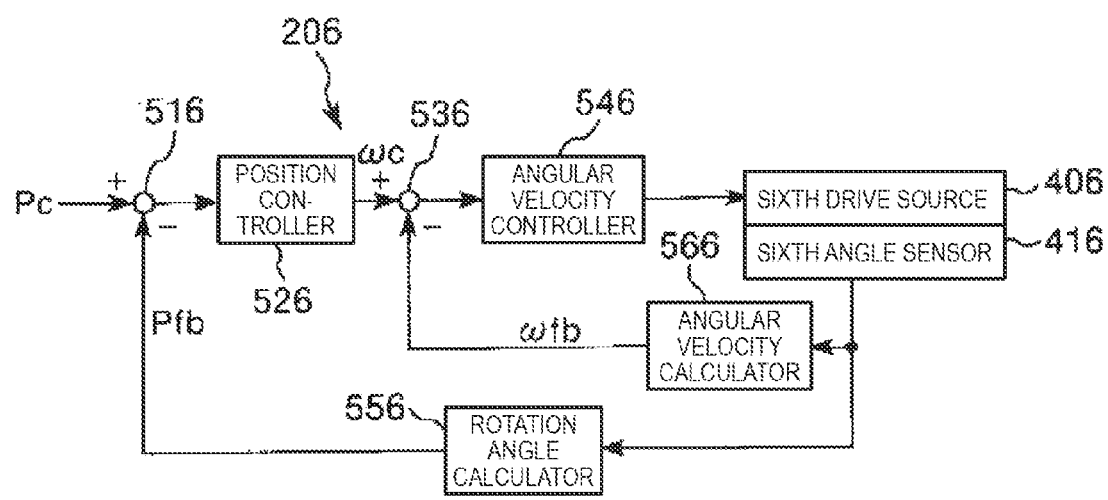
FIG. 10 is a block diagram of main portions of the robot shown in FIG. 1.
Figure 11:
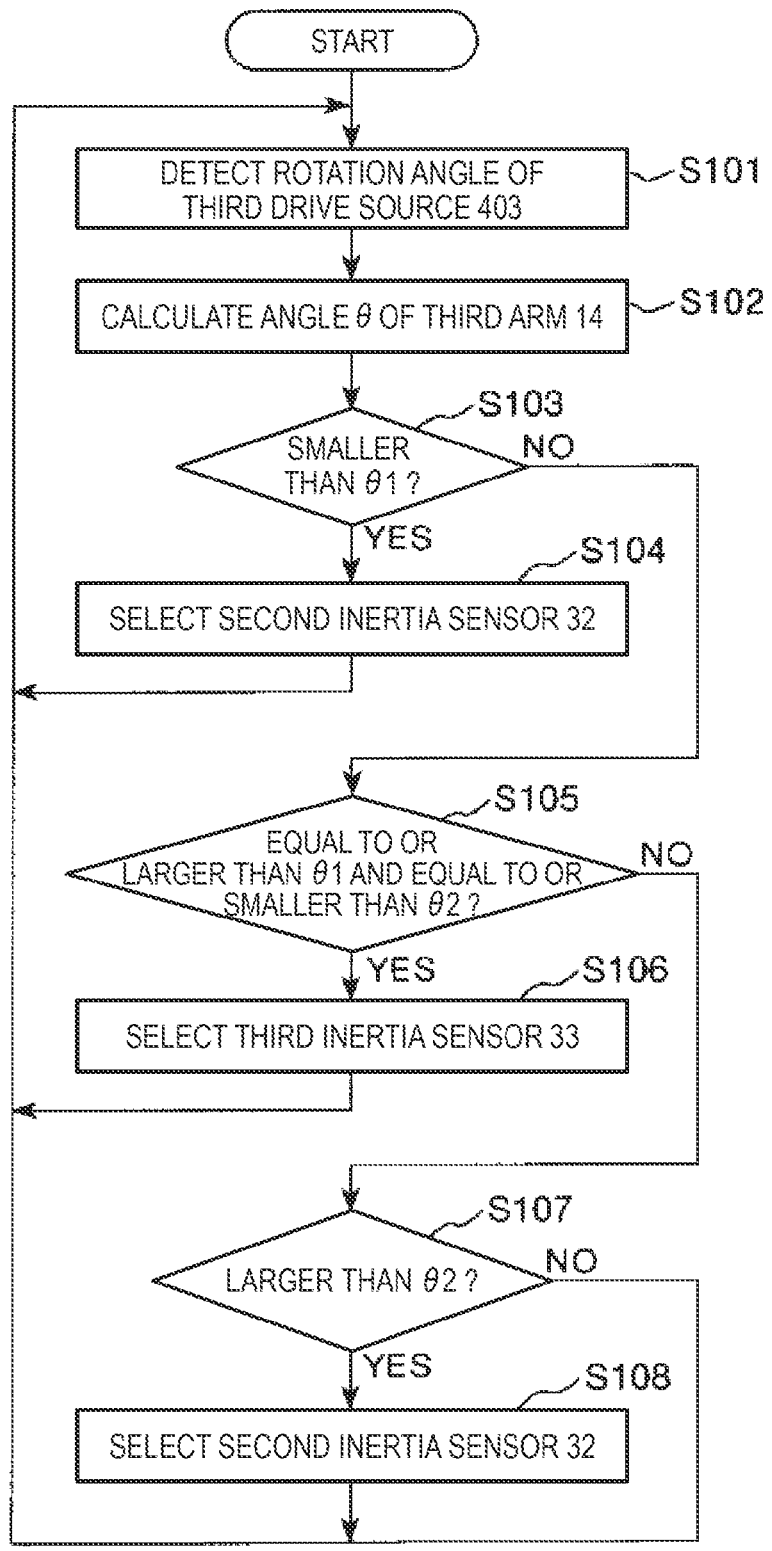
FIG. 11 is a flowchart showing the control operation of a control device of the robot shown in FIG. 1.

As shown in FIG. 10, the sixth drive source controller 206 has a subtractor 516, a position controller 526, a subtractor 536, an angular velocity controller 546, a rotation angle calculator 556, and an angular velocity calculator 566.

Additionally, the robot 1 has an angle detection unit that detects the angle θ (hereinafter simply referred to as "angle θ of the third arm 14", "angle θ of the arm 14", and "angle θ") formed between an axis (central axis) 131 of the second arm 13, and an axis (central axis) 141 of the third arm 14 (refer to FIG. 4), as a posture detection unit that detects the posture of the third arm 14 from the second arm 13 as a reference point. In the present embodiment, the angle detection unit is constituted by the third angle sensor 413 and the control device 20. That is, the rotation angle calculator 553 of the third drive source controller 203 of the control device 20 counts the number of pulses input from the third angle sensor 413, obtains the rotation angle of the third drive source 403 according to the counted value, and thereby, obtains the current angle θ of the third arm 14.

In the robot 1, the second drive source controller 202 selects an inertia sensor to be used for the control of the operation of the second drive source 402 for suppressing the vibration in the second arm 13 on the basis of a detection result of the angle detection unit (posture detection unit), that is, the detected angle θ of the third arm 14, in the feedback control of the second drive source 402 to be described below. That is, the second drive source controller 202 selects any one of the second inertia sensor 32 and the third inertia sensor 33 on the basis of the detected angle θ of the third arm 14, and controls the operation of the second drive source 402 using a detection result of the selected inertia sensor.

Here, the control device 20 calculates a target position of the wrist 16 on the basis of the contents of processing to be performed by the robot 1, and generates a track for moving the wrist 16 to the target position. The control device 20 measures the rotation angles of the respective drive sources 401 to 406 for every predetermined control cycle so that the wrist 16 moves along the generated track, and outputs values calculated on the basis of the measurement results to the drive source controllers 201 to 206 as position commands Pc of the respective drive sources 401 to 406, respectively (refer to FIGS. 6 to 11). In addition, although "values are input and output" or the like are written in the above and the following, this means "signals corresponding to the values are input and output".

As shown in FIG. 6, in addition to a position command Pc of the first drive source 401, detection signals are input from the first angle sensor 411 and the first inertia sensor 31, respectively, to the first drive source controller 201. The first drive source controller 201 drives the first drive source 401 by a feedback control using the respective detection signals so that a rotation angle (position feedback value Pfb) of the first drive source calculated from the detection signal of the first angle sensor 411 becomes the position command Pc and an angular velocity feedback value ωfb to be described below becomes an angular velocity command ωc to be described below.

That is, the position command Pc is input to the subtractor 511 of the first drive source controller 201, and the position feedback value Pfb to be described below is input from the rotation angle calculator 551. In the rotation angle calculator 551, the number of pulses input from the first angle sensor 411 is counted, and the rotation angle of the first drive source 401 according to the counted value is output to the subtractor 511 as the position feedback value Pfb. The subtractor 511 outputs a deviation (value obtained by subtracting the position feedback value Pfb from a targeted value of the rotation angle of the first drive source 401) between the position command Pc and the position feedback value Pfb to the position controller 521.

The position controller 521 performs predetermined calculation processing using the deviation input from the subtractor 511 and a proportional gain that is a predetermined factor, and calculates the targeted value of the angular velocity of the first drive source 401 according to the deviation. The position controller 521 outputs a signal showing the targeted value (command value) of the angular velocity of the first drive source 401 to the subtractor 531 as the angular velocity command (first angular velocity command) ωc. In addition, in the present embodiment, a proportional control (P control) is performed as the feedback control. However, the feedback control is not limited to this.

The angular velocity command ωc and the angular velocity feedback value ωfb to be described below are input to the subtractor 531. The subtractor 531 outputs a deviation (value obtained by subtracting the angular velocity feedback value ωfb from the targeted value of the angular velocity of the first drive source 401) between the angular velocity command ωc and the angular velocity feedback value ωfb to the angular velocity controller 541.

The angular velocity controller 541 performs predetermined calculation processing including integration, using the deviation input from the subtractor 531, a proportional gain that is a predetermined factor, an integration gain, or the like, thereby generating a driving signal (driving current) of the first drive source 401 according to the deviation and supplying the driving signal to the motor 401M via the motor driver 301. In addition, in the present embodiment, the PI control is performed as the feedback control. However, the feedback control is not limited to this.

In this way, the feedback control is performed and the driving current of the first drive source 401 is controlled so that the position feedback value Pfb is as equal to the position command Pc as possible and the angular velocity feedback value ωfb is as equal to the angular velocity command ωc as possible.

Next, the angular velocity feedback value ωfb in the first drive source controller 201 will be described.

In the angular velocity calculator 561, an angular velocity ωm1 of the first drive source 401 is calculated on the basis of the frequency of a pulse signal input from the first angle sensor 411, and the angular velocity ωm1 is output to the adder 601.

Additionally, in the angular velocity calculator 561, an angular velocity ωA1m of the first arm 12 around the rotation axis O1 is calculated on the basis of the frequency of the pulse signal input from the first angle sensor 411, and the angular velocity ωA1m is output to the subtractor 571. In addition, the angular velocity ωA1m is a value obtained by dividing the angular velocity ωm1 by a reduction ratio between the motor 401M of the first drive source 401 and the first arm 12, that is, in the joint 171.

Additionally, the angular velocity of the first arm 12 around the rotation axis O1 is detected by the first inertia sensor 31. A detection signal of the first inertia sensor 31, that is, an angular velocity ωA1 of the first arm 12 around the rotation axis O1 detected by the first inertia sensor 31 is output to the subtractor 571.

The angular velocity ωA1 and the angular velocity ωA1m are input to the subtractor 571, and the subtractor 571 outputs a value ωA1s (=ωA1−ωA1m) obtained by subtracting the angular velocity ωA1m from the angular velocity ωA1 to the converter 581. The value ωA1s is equivalent to a vibration component (vibration angular velocity) of the angular velocity of the first arm 12 around the rotation axis O1. Hereinafter, ωA1s is referred to as a vibration angular velocity. In the present embodiment, a feedback control is performed in which the vibration angular velocity ωA1s (in detail, an angular velocity ωm1s in the motor 401M that is a value generated on the basis of the vibration angular velocity ωA1s) is multiplied by a gain Ka to be described below and is returned to the input side of the drive source 401. Specifically, a feedback control is performed on the drive source 401 so that the vibration angular velocity ωA1s becomes as close to 0 as possible. Accordingly, the vibration in the robot 1 can be suppressed. In addition, the angular velocity of the drive source 401 is controlled in the feedback control.

The converter 581 converts the vibration angular velocity ωA1s into the angular velocity ωm1s in the first drive source 401, and outputs the angular velocity ωm1s to the correction value calculator 591. This conversion can be obtained by multiplying the vibration angular velocity ωA1s by the reduction ratio between the motor 401M of the first drive source 401 and the first arm 12, that is, in the joint 171.

The correction value calculator 591 multiplies the angular velocity ωm1s by a gain (feedback gain) Ka that is a predetermined factor, obtains a correction value (first correction component) Ka·ωm1s, and outputs the correction value Ka·ωm1s to the adder 601.

The angular velocity ωm1 and the correction value Ka·ωm1s are input to the adder 601. The adder 601 outputs an additional value of the angular velocity ωm1 and the correction value Ka·ωm1s to the subtractor 531 as the angular velocity feedback value ωfb. In addition, the subsequent operation is as mentioned above.

As shown in FIG. 7, in addition to a position command Pc of the second drive source 402, detection signals are input from the second angle sensor 412 and the second inertia sensor 32, respectively, to the second drive source controller 202. The second drive source controller 202 drives the second drive source 402 by a feedback control using the respective detection signals so that a rotation angle (position feedback value Pfb) of the second drive source 402 calculated from the detection signal of the second angle sensor 412 becomes the position command Pc and an angular velocity feedback value ωfb to be described below becomes an angular velocity command ωc to be described below.

That is, the position command Pc is input to the subtractor 512 of the second drive source controller 202, and the position feedback value Pfb to be described below is input from the rotation angle calculator 552. In the rotation angle calculator 552, the number of pulses input from the second angle sensor 412 is counted, and the rotation angle of the second drive source 402 according to the counted value is output to the subtractor 512 as the position feedback value Pfb. The subtractor 512 outputs a deviation (value obtained by subtracting the position feedback value Pfb from a targeted value of the rotation angle of the second drive source 402) between the position command Pc and the position feedback value Pfb to the position controller 522.

The position controller 522 performs predetermined calculation processing using the deviation input from the subtractor 512 and a proportional gain that is a predetermined factor, and calculates the targeted value of the angular velocity of the second drive source 402 according to the deviation. The position controller 522 outputs a signal showing the targeted value (command value) of the angular velocity of the second drive source 402 to the subtractor 532 as the angular velocity command (second angular velocity command) ωc. In addition, in the present embodiment, a proportional control (P control) is performed as the feedback control. However, the feedback control is not limited to this.

The angular velocity command ωc and the angular velocity feedback value ωfb to be described below are input to the subtractor 532. The subtractor 532 outputs a deviation (value obtained by subtracting the angular velocity feedback value ωfb from the targeted value of the angular velocity of the second drive source 402) between the angular velocity command ωc and the angular velocity feedback value ωfb to the angular velocity controller 542.

The angular velocity controller 542 performs predetermined calculation processing including integration, using the deviation input from the subtractor 532, a proportional gain that is a predetermined factor, an integration gain, or the like, thereby generating a driving signal (driving current) of the second drive source 402 according to the deviation and supplying the driving signal to the motor 402M via the motor driver 302. In addition, in the present embodiment, the PI control is performed as the feedback control. However, the feedback control is not limited to this.

In this way, the feedback control is performed and the driving current of the second drive source 402 is controlled so that the position feedback value Pfb is as equal to the position command Pc as possible and the angular velocity feedback value ωfb is as equal to the angular velocity command We as possible. In addition, since the rotation axis O2 is orthogonal to the rotation axis O1, the rotation axis is not influenced by the operation or vibration of the first arm 12, and the operation of the second drive source 402 can be controlled independently from the first drive source 401.

Next, the angular velocity feedback value ωfb in the second drive source controller 202 will be described.

First, the second drive source controller 202 selects, according to the angle θ of the third arm 14, a case where the switches 632 and 642 are switched so that the angular velocity ωA3, an angular velocity ωA2m, and the angular velocity ωA3m to be described below are input to the adder-subtractor 622 and a case where the switches 632 and 642 are switched so that the angular velocity ωA2 and the angular velocity ωA2m to be described below are input.

That is, when the angle θ is equal to or larger than a first threshold θ1 and equal to or smaller than a second threshold θ2 larger than the first threshold θ1, the third arm 14 is in a state (hereinafter simply referred to as an "extended state" or an "extended posture") where the third arm 14 is extended or slightly curved with respect to the second arm 13. In this case, the second drive source controller 202 selects the third inertia sensor 33 as the inertia sensor to be used. The second drive source controller 202 switches the switches 632 and 642 so that the angular velocity ωA3, the angular velocity ωA2m, and the angular velocity ωA3m are input to the adder-subtractor 622. In addition, the first threshold θ1 is an angle that is smaller than 180°.

Additionally, when the angle θ is smaller than the first threshold θ1 or larger than the second threshold θ2, the third arm 14 is in a state (hereinafter simply referred to as a "folded state" or a "folded posture") where the third arm 14 is largely curved with respect to the second arm 13. In this case, the second drive source controller 202 selects the second inertia sensor 32 as the inertia sensor to be used. The second drive source controller 202 switches the switches 632 and 642 so that the angular velocity ωA2 and the angular velocity ωA2m are input to the adder-subtractor 622. In addition, the second threshold θ2 is an angle that is larger than 180°.

Accordingly, the compatibility between enhancing the effect of suppressing vibration and the stability of control can be achieved.

That is, when the third arm 14 is in the extended posture, compared to the case of the folded posture, the control of the robot 1 is stable, but the inertia moment of the robot 1 is large and the vibration in the robot is large. Thus, the effect of suppressing vibration can be enhanced by controlling the second drive source 402, using a detection result of the third inertia sensor 33 installed at the third arm 14 on the tip side of the second arm 13 where a larger vibration than the second arm 13 is generated.

On the other hand, when the third arm 14 is in the folded posture, compared to the case of the extended posture, the inertia moment of the robot 1 is small and the vibration in the robot is small. However, the phase of the vibration in third arm 14 on the tip side is different from the phase of the second arm 13 on the base end side. Therefore, if the second drive source 402 on the base end side that drives the second arm 13 is controlled using a detection result of the third inertia sensor 33 installed at the third arm 14 on the tip side, control tends to become unstable and the robot 1 vibrates easily. Thus, by controlling the second drive source 402 using the detection result of the second inertia sensor 32 installed at the second arm 13 itself on the base end side, control can be stabilized and the vibration in the robot 1 can be prevented.

Although the first threshold θ1 is not particularly limited and is appropriately set according to terms and conditions, the first threshold θ1 is preferably set within a range of 60° to 150° and is more preferably set within a range of 70° to 140°. As one example, the first threshold θ1 is set to 90°, for example. Although the second threshold θ2 is not particularly limited and is appropriately set according to terms and conditions, the second threshold θ2 is preferably set within a range of 210° to 300° and is more preferably set within a range of 220° to 290°. As one example, the second threshold θ2 is set to 270°, for example. Additionally, the second threshold θ2 is preferably "360°−θ1". Accordingly, the compatibility between enhancing the effect of suppressing vibration and the stability of control can be reliably achieved.

First, a case where the angle θ of the third arm 14 is smaller than the first threshold θ1 or larger than the second threshold θ2 will be described.

In this case, in the angular velocity calculator 562, an angular velocity ωm2 of the second drive source 402 is calculated on the basis of the frequency of a pulse signal input from the second angle sensor 412, and the angular velocity ωm2 is output to the adder 602.

Additionally, in the angular velocity calculator 562, the angular velocity ωA2m of the second arm 13 around the rotation axis O2 is calculated on the basis of the frequency of the pulse signal input from the second angle sensor 412, and the angular velocity ωA2m is output to the adder-subtractor 622. In addition, the angular velocity ωA2m is a value obtained by dividing the angular velocity ωm2 by a reduction ratio between the motor 402M of the second drive source 402 and the second arm 13, that is, in the joint 172.

Additionally, the angular velocity of the second arm 13 around the rotation axis O2 is detected by the second inertia sensor 32. A detection signal of the second inertia sensor 32, that is, an angular velocity ωA2 of the second arm 13 around the rotation axis O2 detected by the second inertia sensor 32 is output to the adder-subtractor 622. In addition, since the rotation axis O2 is orthogonal to the rotation axis O1, the angular velocity of the second arm 13 around the rotation axis O2 can be easily and reliably obtained without being influenced by the operation or vibration of the first arm 12.

The angular velocity ωA2 and the angular velocity ωA2m are input to the adder-subtractor 622, and the adder-subtractor 622 outputs a value ωA2s (=ωA2−ωA2m) obtained by subtracting the angular velocity ωA2m from the angular velocity ωA2 to the converter 582. The value ωA2s is equivalent to a vibration component (vibration angular velocity) of the angular velocity of the second arm 13 around the rotation axis O2. Hereinafter, ωA2s is referred to as a vibration angular velocity. In the present embodiment, a feedback control is performed in which the vibration angular velocity ωA2s (in detail, an angular velocity ωm2s in the motor 402M that is a value generated on the basis of the vibration angular velocity ωA2s) is multiplied by a gain Ka to be described below and is returned to the input side of the second drive source 402. Specifically, a feedback control is performed on the second drive source 402 so that the vibration angular velocity ωA2s becomes as close to θ as possible. Accordingly, the vibration in the robot 1 can be suppressed. In addition, the angular velocity of the second drive source 402 is controlled in the feedback control.

The converter 582 converts the vibration angular velocity ωA2s into the angular velocity ωm2s in the second drive source 402, and outputs the angular velocity ωm2s to the correction value calculator 592. This conversion can be obtained by multiplying the vibration angular velocity ωA2s by the reduction ratio between the motor 402M of the second drive source 402 and the second arm 13, that is, in the joint 172.

The correction value calculator 592 multiplies the angular velocity ωm2s by a gain (feedback gain) Ka that is a predetermined factor, obtains a correction value (second (B) correction component) Ka·ωm2s, and outputs the correction value Ka·ωm2s to the adder 602. In addition, the gain Ka in the second drive source controller 202 and the gain Ka in the first drive source controller 201 may be the same or may be different.

The angular velocity ωm2 and the correction value Ka·ωm2s are input to the adder 602. The adder 602 outputs an additional value of the angular velocity ωm2 and the correction value Ka·ωm2s to the subtractor 532 as the angular velocity feedback value ωfb. In addition, the subsequent operation is as mentioned above.

Next, a case where the angle θ of the third arm 14 is equal to or larger than the first threshold θ1 and smaller than the second threshold θ2 will be described.

In this case, in the angular velocity calculator 562, an angular velocity ωm2 of the second drive source 402 is calculated on the basis of the frequency of a pulse signal input from the second angle sensor 412, and the angular velocity ωm2 is output to the adder 602.

Additionally, in the angular velocity calculator 562, the angular velocity ωA2m of the second arm 13 around the rotation axis O2 is calculated on the basis of the frequency of the pulse signal input from the second angle sensor 412, and the angular velocity ωA2m is output to the adder-subtractor 622. In addition, the angular velocity ωA2m is a value obtained by dividing the angular velocity ωm2 by a reduction ratio between the motor 402M of the second drive source 402 and the second arm 13, that is, in the joint 172.

Additionally, in the angular velocity calculator 563 of the third drive source controller 203, an angular velocity ωA3m of the third arm 14 around the rotation axis O3 is calculated on the basis of the frequency of the pulse signal input from the third angle sensor 413, and the angular velocity ωA3m is output to the adder-subtractor 622. In addition, the angular velocity ωA3m is a value obtained by dividing the angular velocity ωm3 of the third drive source 403 calculated on the basis of the frequency of the pulse signal input from the third angle sensor 413 by a reduction ratio between the motor 403M of the third drive source 403 and the third arm 14, that is, in the joint 173.

Additionally, the angular velocity of the third arm 14 around the rotation axis O2 is detected by the third inertia sensor 33. A detection signal of the third inertia sensor 33, that is, an angular velocity ωA3 of the third arm 14 around the rotation axis O2 detected by the third inertia sensor 33 is output to the adder-subtractor 622. In addition, since the rotation axes O2 and O3 are orthogonal to the rotation axis O1, respectively, the angular velocity of the third arm 14 around the rotation axis O2 can be easily and reliably obtained without being influenced by the operation or vibration of the first arm 12.

The angular velocity ωA3, the angular velocity ωA2m, and the angular velocity ωA3m are input to the adder-subtractor 622, and the adder-subtractor 622 outputs a value ωA2s (=ωA3−ωA2m−ωA3m) obtained by subtracting the angular velocity ωA2m and the angular velocity ωA3m from the angular velocity ωA3 to the converter 582. The value ωA2s is equivalent to a vibration component (vibration angular velocity) of the total angular velocity of the second arm 13 and the third arm 14 around the rotation axis O2. Hereinafter, ωA2s is referred to as a vibration angular velocity. In the present embodiment, a feedback control is performed in which the vibration angular velocity ωA2s (in detail, an angular velocity ωm2s in the second drive source 402 that is a value generated on the basis of the vibration angular velocity ωA2s) is multiplied by a gain Ka and is returned to the input side of the second drive source 402 as a second (A) correction component. Specifically, a feedback control is performed on the second drive source 402 so that the vibration angular velocity ωA2s becomes as close to 0 as possible. Accordingly, the vibration in the robot 1 can be suppressed. In addition, the angular velocity of the second drive source 402 is controlled in the feedback control. The subsequent operation is as mentioned above.

As shown in FIG. 7, in addition to a position command Pc of the third drive source 403, detection signals are input from the third angle sensor 413, the second inertia sensor 32, and the third inertia sensor 33, respectively, to the third drive source controller 203. The third drive source controller 203 drives the third drive source 403 by a feedback control using the respective detection signals so that a rotation angle (position feedback value Pfb) of the third drive source 403 calculated from the detection signal of the third angle sensor 413 becomes the position command Pc and an angular velocity feedback value ωfb to be described below becomes an angular velocity command ωc to be described below.

That is, the position command Pc is input to the subtractor 513 of the third drive source controller 203, and the position feedback value Pfb to be described below is input from the rotation angle calculator 553. In the rotation angle calculator 553, the number of pulses input from the third angle sensor 413 is counted, and the rotation angle of the third drive source 403 according to the counted value is output to the subtractor 513 as the position feedback value Pfb. The subtractor 513 outputs a deviation (value obtained by subtracting the position feedback value Pfb from a targeted value of the rotation angle of the third drive source 403) between the position command Pc and the position feedback value Pfb to the position controller 523.

The position controller 523 performs predetermined calculation processing using the deviation input from the subtractor 513, a proportional gain that is a predetermined factor, and the like and calculates the targeted value of the angular velocity of the third drive source 403 according to the deviation. The position controller 523 outputs a signal showing the targeted value (command value) of the angular velocity of the third drive source 403 to the subtractor 533 as the angular velocity command (third angular velocity command) ωc. In addition, in the present embodiment, a proportional control (P control) is performed as the feedback control. However, the feedback control is not limited to this.

The angular velocity command ωc and the angular velocity feedback value ωfb to be described below are input to the subtractor 533. The subtractor 533 outputs a deviation (value obtained by subtracting the angular velocity feedback value ωfb from the targeted value of the angular velocity of the third drive source 403) between the angular velocity command ωc and the angular velocity feedback value ωfb to the angular velocity controller 543.

The angular velocity controller 543 performs predetermined calculation processing including integration, using the deviation input from the subtractor 533, a proportional gain that is a predetermined factor, an integration gain, or the like, thereby generating a driving signal (driving current) of the third drive source 403 according to the deviation and supplying the driving signal to the motor of the third drive source 403 via the motor driver 303. In addition, in the present embodiment, the PI control is performed as the feedback control. However, the feedback control is not limited to this.

In this way, the feedback control is performed and the driving current of the third drive source 403 is controlled so that the position feedback value Pfb is as equal to the position command Pc as possible and the angular velocity feedback value ωfb is as equal to the angular velocity command We as possible. In addition, since the rotation axis O3 is orthogonal to the rotation axis O1, the rotation axis is not influenced by the operation or vibration of the first arm 12, and the operation of the third drive source 403 can be controlled independently from the first drive source 401.

Next, the angular velocity feedback value ωfb in the third drive source controller 203 will be described.

In the angular velocity calculator 563, an angular velocity ωm3 of the third drive source 403 is calculated on the basis of the frequency of a pulse signal input from the third angle sensor 413, and the angular velocity ωm3 is output to the adder 603.

Additionally, in the angular velocity calculator 563, an angular velocity ωA3m of the third arm 14 around the rotation axis O3 is calculated on the basis of the frequency of the pulse signal input from the third angle sensor 413, and the angular velocity ωA3m is output to the adder-subtractor 613. In addition, the angular velocity ωA3m is a value obtained by dividing the angular velocity ωm3 by a reduction ratio between the motor 403M of the third drive source 403 and the third arm 14, that is, in the joint 173.

Additionally, the angular velocity of the third arm 14 around the rotation axis O2 is detected by the third inertia sensor 33. A detection signal of the third inertia sensor 33, that is, an angular velocity ωA3 of the third arm 14 around the rotation axis O2 detected by the third inertia sensor 33 is output to the adder-subtractor 613. In addition, since the rotation axes O2 and O3 are orthogonal to the rotation axis O1, respectively, the angular velocity of the third arm 14 around the rotation axis O2 can be easily and reliably obtained without being influenced by the operation or vibration of the first arm 12.

Additionally, the detection signal of the aforementioned second inertia sensor 32, that is, the angular velocity ωA2 of the second arm 13 around the rotation axis O2 detected by the second inertia sensor 32 is output to the adder-subtractor 613.

The angular velocity ωA3, the angular velocity ωA2, and the angular velocity ωA3m are input to the adder-subtractor 613, and the adder-subtractor 613 outputs a value ωA3s (=ωA3−ωA2−ωA3m) obtained by subtracting the angular velocity ωA2 and the angular velocity ωA3m from the angular velocity ωA3 to the converter 583. The value ωA3s is equivalent to a vibration component (vibration angular velocity) of the angular velocity of the third arm 14 around the rotation axis O3. Hereinafter, ωA3s is referred to as a vibration angular velocity. In the present embodiment, a feedback control is performed in which the vibration angular velocity ωA3s (in detail, an angular velocity ωm3s in the motor 403M that is a value generated on the basis of the vibration angular velocity ωA3s) is multiplied by a gain Ka to be described below and is returned to the input side of the third drive source 403. Specifically, a feedback control is performed on the third drive source 403 so that the vibration angular velocity ωA3s becomes as close to 0 as possible. Accordingly, the vibration in the robot 1 can be suppressed. In addition, the angular velocity of the third drive source 403 is controlled in the feedback control.

The converter 583 converts the vibration angular velocity ωA3s into the angular velocity ωm3s in the third drive source 403, and outputs the angular velocity ωm3s to the correction value calculator 593. This conversion can be obtained by multiplying the vibration angular velocity ωA3s by the reduction ratio between the motor 403M of the third drive source 403 and the third arm 14, that is, in the joint 173.

The correction value calculator 593 multiplies the angular velocity ωm3s by a gain (feedback gain) Ka that is a predetermined factor, obtains a correction value (third correction component) Ka·ωm3s, and outputs the correction value Ka·ωm3s to the adder 603. In addition, the gain Ka in the third drive source controller 203, the gain Ka in the first drive source controller 201, and the gain Ka in the second drive source controller 202 may be the same or may be different, respectively.

The angular velocity ωm3 and the correction value Ka·ωm3s are input to the adder 603. The adder 603 outputs an additional value of the angular velocity ωm3 and the correction value Ka·ωm3s to the subtractor 533 as the angular velocity feedback value ωfb. In addition, the subsequent operation is as mentioned above.

As shown in FIG. 8, a detection signal is input to the fourth drive source controller 204 from the fourth angle sensor 414 in addition to the position command Pc of the fourth drive source 404. The fourth drive source controller 204 drives the fourth drive source 404 by a feedback control using the respective detection signals so that a rotation angle (position feedback value Pfb) of the fourth drive source 404 calculated from the detection signal of the fourth angle sensor 414 becomes the position command Pc and an angular velocity feedback value ωfb to be described below becomes an angular velocity command ωc to be described below.

That is, the position command Pc is input to the subtractor 514 of the fourth drive source controller 204, and the position feedback value Pfb to be described below is input from the rotation angle calculator 554. In the rotation angle calculator 554, the number of pulses input from the fourth angle sensor 414 is counted, and the rotation angle of the fourth drive source 404 according to the counted value is output to the subtractor 514 as the position feedback value Pfb. The subtractor 514 outputs a deviation (value obtained by subtracting the position feedback value Pfb from a targeted value of the rotation angle of the fourth drive source 404) between the position command Pc and the position feedback value Pfb to the position controller 524.

The position controller 524 performs predetermined calculation processing using the deviation input from the subtractor 514 and a proportional gain that is a predetermined factor, and calculates the targeted value of the angular velocity of the fourth drive source 404 according to the deviation. The position controller 524 outputs a signal showing the targeted value (command value) of the angular velocity of the fourth drive source 404 to the subtractor 534 as the angular velocity command ωc. In addition, in the present embodiment, a proportional control (P control) is performed as the feedback control. However, the feedback control is not limited to this.

Additionally, in the angular velocity calculator 564, the angular velocity of the fourth drive source 404 is calculated on the basis of the frequency of a pulse signal input from the fourth angle sensor 414, and the angular velocity is output to the subtractor 534 as the angular velocity feedback value ωfb.

The angular velocity command ωc and the angular velocity feedback value ωfb are input to the subtractor 534. The subtractor 534 outputs a deviation (value obtained by subtracting the angular velocity feedback value ωfb from the targeted value of the angular velocity of the fourth drive source 404) between the angular velocity command ωc and the angular velocity feedback value ωfb to the angular velocity controller 544.

The angular velocity controller 544 performs predetermined calculation processing including integration, using the deviation input from the subtractor 534, a proportional gain that is a predetermined factor, an integration gain, or the like, thereby generating a driving signal (driving current) of the fourth drive source 404 according to the deviation and supplying the driving signal to the motor 404M via the motor driver 304. In addition, in the present embodiment, the PI control is performed as the feedback control. However, the feedback control is not limited to this.

In this way, the feedback control is performed and the driving current of the fourth drive source 404 is controlled so that the position feedback value Pfb is as equal to the position command Pc as possible and the angular velocity feedback value ωfb is as equal to the angular velocity command ωc as possible.

In addition, since the fifth drive source controller 205 and the sixth drive source controller 206 are the same as the fourth drive source controller 204, respectively, the description thereof is omitted.

Next, the operation when the inertia sensor to be used for the control of the second drive source 402 of the second drive source controller 202 is selected will be described.

As shown in FIG. 11, first, the second drive source controller 202 detects the rotation angle of the third drive source 403 by the third angle sensor 413 via the third drive source controller 203 (Step S101). That is, the third drive source controller 203 counts the number of pulses input from the third angle sensor 413 and obtains the rotation angle of the third drive source 403 according to the counted value, and the second drive source controller 202 acquires information on the rotation angle of the third drive source 403.

Next, the angle θ of the third arm 14 is obtained on the basis of the rotation angle of the third drive source 403 (Step S102).

Next, it is determined whether or not the angle θ of the third arm 14 is smaller than the first threshold θ1 (Step S103). Then, when the angle θ of the third arm 14 is smaller than the first threshold θ1, the second inertia sensor 32 is selected as the inertia sensor to be used (Step S104).

Additionally, when the angle θ of the third arm 14 is not smaller than the first threshold θ1 in Step S103, it is determined whether or not the angles θ of the third arm 14 is equal to or larger than the first threshold θ1 and equal to or smaller than the second threshold θ2 (Step S105). Then, when the angle θ of the third arm 14 is equal to or larger than the first threshold θ1 and equal to or smaller than the second threshold θ2, the third inertia sensor 33 is selected as the inertia sensor to be used (Step S106).

Additionally, when the angle θ of the third arm 14 is not equal to or larger than the first threshold θ1 and equal to or smaller than the second threshold θ2 in Step S105, it is determined whether or not the angle θ of the third arm 14 is larger than the second threshold θ2 (Step S107). Then, when the angle θ of the third arm 14 is larger than the second threshold θ2, the second inertia sensor 32 is selected as the inertia sensor to be used (Step S108).

The above respective steps are executed for every control cycle, and the return to Step S101 is made again after Steps S104, S106, and S108. Then, Step S101 and the subsequent steps are executed.

As described above, according to the robot 1, the vibration in the robot 1 can be easily and reliably suppressed.

First, in the control of the robot 1, huge calculation is unnecessary, and thereby, response speed in the control of the robot 1 can be increased, and the configuration of the control device 20 can be simplified.

Additionally, in the control of the robot 1, calculation in which a singular point is present is unnecessary. Thus, the control of the robot 1 can be reliably performed, and thereby, vibration can be reliably suppressed.

Additionally, since the inertia sensors 31, 32, and 33 are installed at the arms 12, 13, and 14 on the base end side that does not resonate easily compared to the tip side, the angular velocity of arms 12, 13, and 14 can be reliably detected by the inertia sensors 31, 32, and 33, and vibration can be reliably suppressed.

Additionally, by selecting the inertia sensor to be used for the control of the second drive source 402 according to the posture of the third arm 14, vibration can be reliably suppressed while stabilizing control.

Second Embodiment

A second embodiment will be described below mainly regarding the differences from the aforementioned first embodiment, and the description of the same matters will be omitted.

In the robot 1 of the second embodiment, the second drive source controller 202 selects the inertia sensor to be used for the control of the operation of the second drive source 402 for suppressing the vibration in the second arm 13 by taking into consideration tip load mass at the tip portion of the robot 1, that is, at the tip portion of the wrist 16 in addition to the angle θ of the third arm 14. That is, the second drive source controller 202 selects any one of the second inertia sensor 32 and the third inertia sensor 33 by taking into consideration the tip load mass, and controls the operation of the second drive source 402 using a detection result of the selected inertia sensor.

This tip load mass is the total mass of the manipulator mounted on the tip portion of the wrist 16 that is an arm closest to the tip side and an object to be gripped by the manipulator. That is, the tip load mass is the total mass of the manipulator and the object gripped by the manipulator when the manipulator is gripping the object and is the mass of the manipulator when the manipulator is not gripping the object.

In addition, in the present embodiment, both the mass of the manipulator and the mass of the object gripped by the manipulator are already known, and the masses are stored in advance in a storage (not shown) of the control device 20. Additionally, the control device 20 grasps whether or not the manipulator is gripping the object. Accordingly, the control device 20 always grasps the tip load mass of the robot 1. In addition, the object to be gripped by the manipulator may be a plurality of kinds of objects having different masses.

Specifically, in the present embodiment, the second drive source controller 202 adjusts the first threshold θ1 and the second threshold θ2 (θ2>θ1), respectively, on the basis of tip load mass in the feedback control of the second drive source 402. In this case, as the tip load mass is larger, the first threshold θ1 is set to be larger and the second threshold θ2 is set to be smaller.

This is because control is unstable and vibration occurs easily as the tip load mass is larger. For this reason, by setting the first threshold θ1 to be larger and setting the second threshold θ2 to be smaller as the tip load mass is larger, the second inertia sensor 32 is selected as the inertia sensor to be used even when the third arm 14 is closer to the extended posture, and thereby, the oscillation in the robot 1 can be prevented and control can be stabilized.

In other words, as the tip load mass is smaller, the control of the robot 1 is more stable. Therefore, by setting the first threshold θ1 to be smaller and setting the second threshold θ2 to be larger, the third inertia sensor 33 is selected as the inertia sensor to be used even when the third arm 14 is closer to the folded posture, and thereby, the effect of suppressing vibration can be enhanced.

Next, specific examples will be presented and described.

In addition, here, a case where the tip load mass is 1 kg, a case where the tip load mass is 3 kg, and a case where the tip load mass is 5 kg will be reprehensively described.

First, in the case where the tip load mass is 1 kg, the first threshold θ1 is preferably set within a range of 60° to 120°. As one example, the first threshold is set to 90°, for example. Additionally, the second threshold θ2 is preferably set within a range of 240° to 300°. As one example, the second threshold is set to 270°, for example.

Additionally, in the case where the tip load mass is 3 kg, the first threshold θ1 is preferably set within a range of 80° to 140°. As one example, the first threshold is set to 120°, for example. Additionally, the second threshold θ2 is preferably set within a range of 220° to 280°. As one example, the second threshold is set to 240°, for example.

Additionally, in the case where the tip load mass is 5 kg, the first threshold θ1 is preferably set within a range of 90° to 150°. As one example, the first threshold is set to 135°, for example. Additionally, the second threshold θ2 is preferably set within a range of 210° to 270°. As one example, the second threshold is set to 225°, for example.

According to the robot 1, the same effects as the aforementioned first embodiment are obtained.

In the robot 1, by selecting the inertia sensor to be used according to the posture of the third arm 14 and the tip load mass, vibration can be more reliably suppressed while stabilizing control.

Third Embodiment

Figure 12:
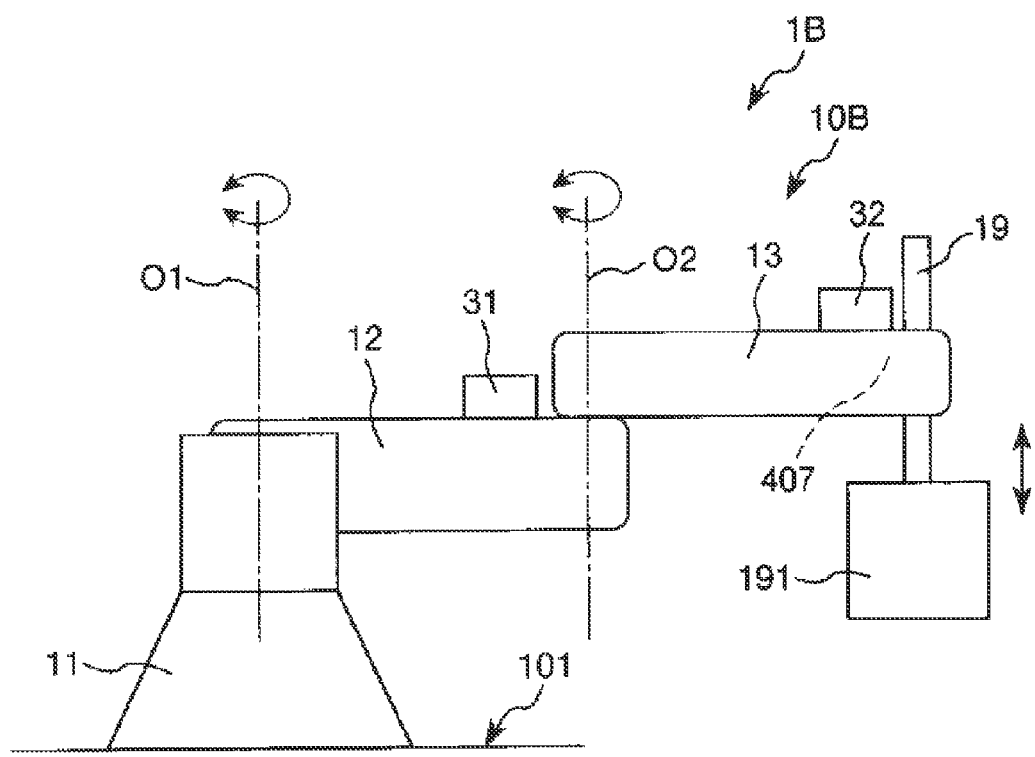
FIG. 12 is a schematic view showing a third embodiment of the robot of the invention.
Figure 13:
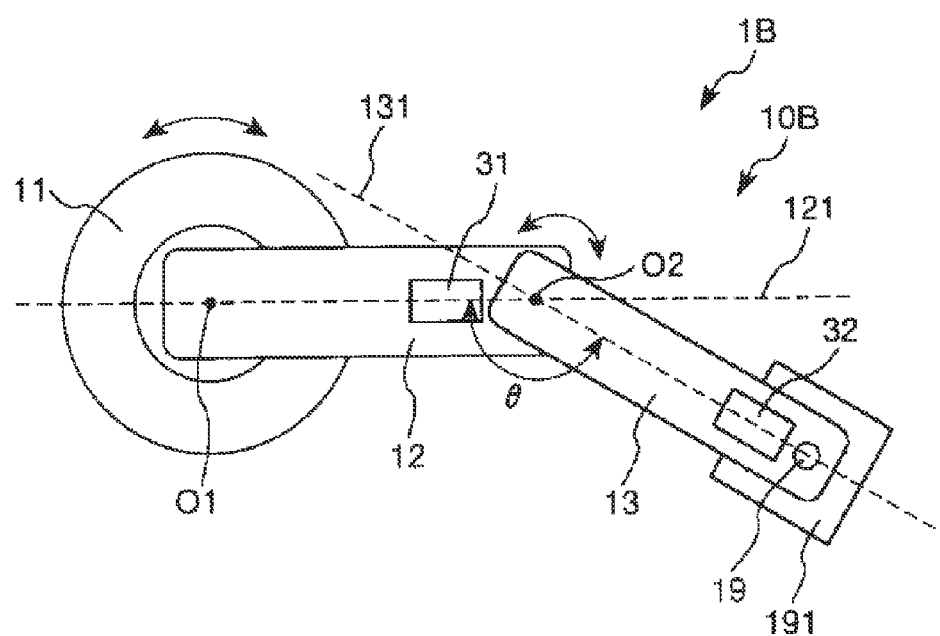
FIG. 13 is a schematic view of the robot shown in FIG. 12.
Figure 14:
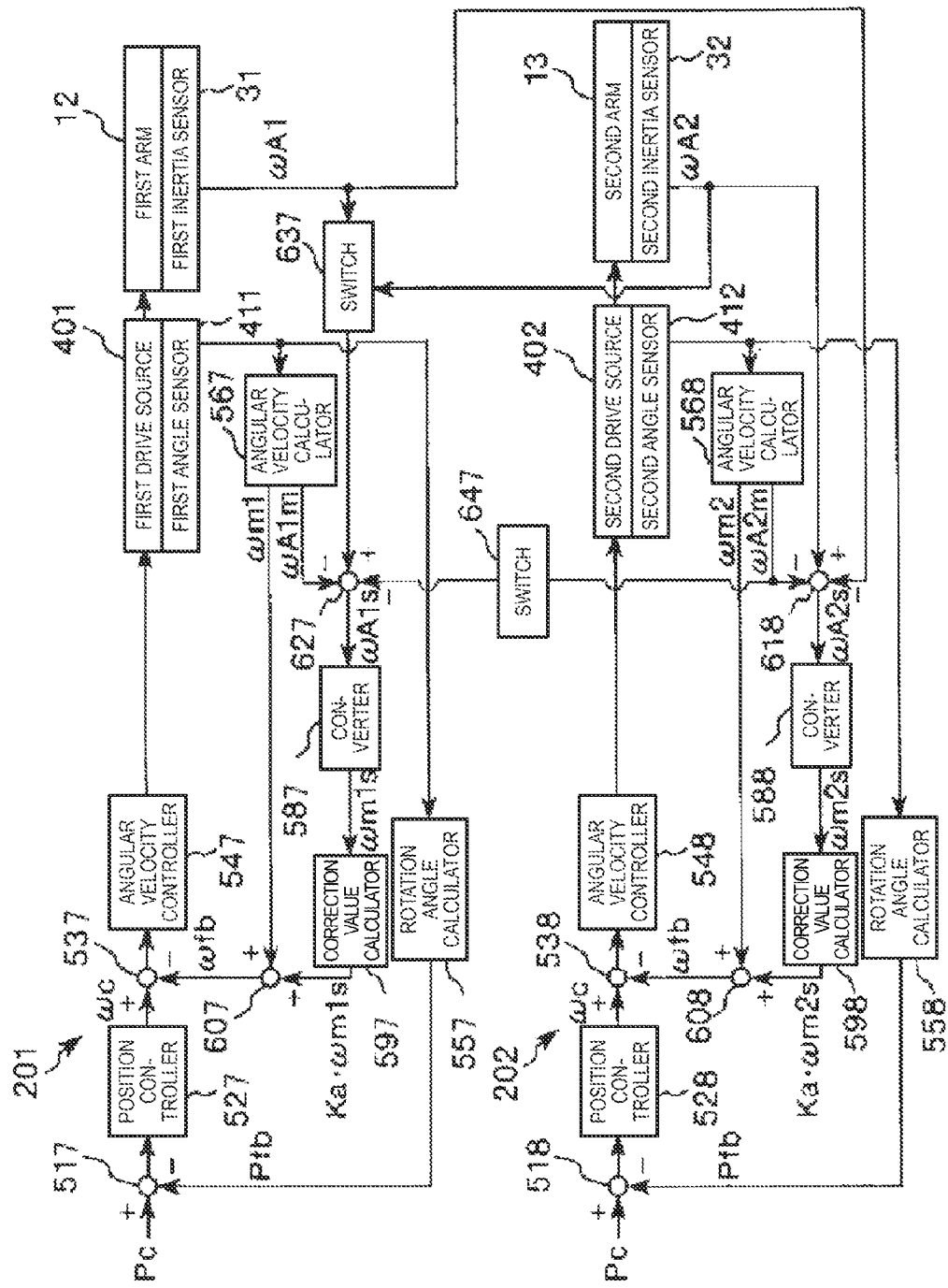
FIG. 14 is a block diagram of main portions of the robot shown in FIG. 12.

FIG. 12 is a schematic view showing a third embodiment of the robot of the invention. FIG. 13 is a schematic view of the robot shown in FIG. 12. FIG. 14 is a block diagram of main portions of the robot shown in FIG. 12.

In addition, in the following, for the convenience of description, the upper side in FIG. 12 is referred to as "upper" and "upside" and the lower side is referred to as "lower" and "downside". Additionally, the base side in FIGS. 12 and 13 is referred to as a "base end", and the opposite side is referred to as a "tip". Additionally, inertia sensors 31 and 32 are shown outside the arms 12 and 13 in FIGS. 12 and 13, respectively, in order to clarify the presence of the sensors.

The third embodiment will be described below mainly regarding differences from the aforementioned first embodiment, and the description of the same matters will be omitted.

A robot 1B of the third embodiment shown in FIGS. 12 and 13 is referred to as a scalar robot.

A robot body 10B of the robot 1B includes a base 11, two arms (links) 12 and 13, a shaft (working shaft) 19, and three drive sources 401, 402, and 407. The base 11, the first arm 12, the second arm 13, and the shaft 19 are coupled together in this order from the base end side toward the tip side. Additionally, the shaft 19 has amount 191 on which a functional portion (end effector) is detachably mounted, at a lower end portion (tip portion) thereof. In addition, the shaft 19 can also be regarded as an arm (third arm) closest to the tip side.

As shown in FIGS. 12 and 13, the first arm 12, the second arm 13, and a shaft 19 are supported so as to be independently displaceable with respect to the base 11.

The base 11 and the first arm 12 are coupled together via a joint 171. The first arm 12 has a first rotation axis O1 parallel to the vertical direction as a rotation center, and is rotatable with respect to the base 11 around the first rotation axis O1. The first rotation axis O1 coincides with the normal line of an upper surface of a floor 101 that is an installation surface of the base 11. The rotation around the first rotation axis O1 is performed by the driving of the first drive source 401. Additionally, the driving (operation) of the first drive source 401 is controlled by the control device 20 via the motor driver 301 that is electrically connected to the first drive source 401 via a cable (not shown).

The first arm 12 and the second arm 13 are coupled together via a joint 172. The second arm 13 has a second rotation axis O2 parallel to the vertical direction as a rotation center, and is rotatable with respect to the first arm 12 (base 11) around the second rotation axis O2. The second rotation axis O2 is parallel to the first rotation axis O1. The rotation around the second rotation axis O2 is performed by the driving of the second drive source 402. Additionally, the driving of the second drive source 402 is controlled by the control device 20 via the motor driver 302 that is electrically connected to the second drive source 402 via a cable (not shown).

The shaft 19 is coupled to a tip portion (an end portion opposite the base 11) of the second arm 13. In this case, the shaft 19 is installed so as to be movable along the direction of an axis (central axis) of the shaft 19 with respect to the second arm 13. Additionally, although the axis of the shaft 19 is parallel to the rotation axes O1 and O2, the axis of the shaft is not limited to this. Additionally, the movement of the shaft 19 is performed by the driving of the third drive source 407. Additionally, the driving of the third drive source 407 is controlled by the control device 20 via a motor driver (not shown) that is electrically connected to the third drive source 407 via a cable (not shown). In addition, the axis of the shaft 19 may not be parallel to the rotation axes O1 and O2.

In addition, a third angle sensor (not shown) is provided at the third drive source 407, similar to the first drive source 401 and the second drive source 402. The third drive source 407 and the third angle sensor are stored in the second arm 13, respectively, and are electrically connected to the control device 20.

Additionally, a movement support mechanism (not shown) that supports the shaft 19 so as to be movable with respect to the second arm 13 is provided within the second arm 13. The movement support mechanism transmits the driving force of the third drive source 407 to the shaft 19, and moves the shaft 19 with respect to the second arm 13.

Next, the configuration of the control device 20 will be described with reference to FIG. 14.

As shown in FIG. 14, the control device 20 has a first drive source controller (first drive source control unit) (first angular velocity command) 201 that controls the operation of the first drive source 401, a second drive source controller (second drive source control unit) (second angular velocity command) 202 that controls the operation of the second drive source 402, and a third drive source controller (third drive source control unit) (not shown) 203 that controls the operation of the third drive source 407. The first drive source controller 201 and the second drive source controller 202 will be described below.

As shown in FIG. 14, the first drive source controller 201 has a subtractor 517, a position controller 527, a subtractor 537, an angular velocity controller 547, a rotation angle calculator 557, an angular velocity calculator 567, an adder-subtractor 627, a converter 587, a correction value calculator 597, an adder 607, and switches 637 and 647. In addition, the switch 637 selects any one the angular velocity ωA1 and the angular velocity ωA2 to be described below, and it outputs to an adder-subtractor 627. Additionally, the switch 647 switches between a case where an angular velocity ωA2m to be described below is output to the adder-subtractor 627 and a case where the angular velocity ωA2m is not output to the adder-subtractor 627. In addition, the first drive source controller 201 is the same as the second drive source controller 202 of the first embodiment.

The second drive source controller 202 has a subtractor 518, a position controller 528, a subtractor 538, an angular velocity controller 548, a rotation angle calculator 558, an angular velocity calculator 568, an adder-subtractor 618, a converter 588, a correction value calculator 598, and an adder 608. In addition, the second drive source controller 202 is the same as the third drive source controller 203 of the first embodiment.

Additionally, the robot 1B has an angle detection unit that detects the angle θ (hereinafter simply referred to as "angle θ of the second arm 13", "angle θ of the arm 13", and "angle θ") formed between an axis (central axis) 121 of the first arm 12, and an axis (central axis) 131 of the second arm 13 (refer to FIG. 13), as a posture detection unit that detects the posture of the second arm 13 from the first arm 12 as a reference point. In the present embodiment, the angle detection unit is constituted by the second angle sensor 412 and the control device 20. That is, the rotation angle calculator 558 of the second drive source controller 202 of the control device 20 counts the number of pulses input from the second angle sensor 412, obtains the rotation angle of the second drive source 402 according to the counted value, and thereby, obtains the current angle θ of the second arm 13.

In the robot 1B, the first drive source controller 201 selects an inertia sensor to be used for the control of the operation of the first drive source 401 for suppressing the vibration in the first arm 12 on the basis of a detection result of the angle detection unit (posture detection unit), that is, the detected angle θ of the second arm 13, in the feedback control of the first drive source 401 to be described below. That is, the first drive source controller 201 selects any one of the first inertia sensor 31 and the second inertia sensor 32 on the basis of the detected angle θ of the second arm 13, and controls the operation of the first drive source 401 using a detection result of the selected inertia sensor.

As shown in FIG. 14, in addition to a position command Pc of the first drive source 401, detection signals are input from the first angle sensor 411 and the first inertia sensor 31, respectively, to the first drive source controller 201. The first drive source controller 201 drives the first drive source 401 by a feedback control using the respective detection signals so that a rotation angle (position feedback value Pfb) of the first drive source 401 calculated from the detection signal of the first angle sensor 411 becomes the position command Pc and an angular velocity feedback value ωfb to be described below becomes an angular velocity command ωc to be described below.

That is, the position command Pc is input to the subtractor 517 of the first drive source controller 201, and the position feedback value Pfb to be described below is input from the rotation angle calculator 557. In the rotation angle calculator 557, the number of pulses input from the first angle sensor 411 is counted, and the rotation angle of the first drive source 401 according to the counted value is output to the subtractor 511 as the position feedback value Pfb. The subtractor 517 outputs a deviation (value obtained by subtracting the position feedback value Pfb from a targeted value of the rotation angle of the first drive source 401) between the position command Pc and the position feedback value Pfb to the position controller 527.

The position controller 527 performs predetermined calculation processing using the deviation input from the subtractor 517 and a proportional gain that is a predetermined factor, and calculates the targeted value of the angular velocity of the first drive source 401 according to the deviation. The position controller 527 outputs a signal showing the targeted value (command value) of the angular velocity of the first drive source 401 to the subtractor 537 as the angular velocity command (first angular velocity command) ωc. In addition, in the present embodiment, a proportional control (P control) is performed as the feedback control. However, the feedback control is not limited to this.

The angular velocity command ωc and the angular velocity feedback value ωfb to be described below are input to the subtractor 537. The subtractor 537 outputs a deviation (value obtained by subtracting the angular velocity feedback value ωfb from the targeted value of the angular velocity of the first drive source 401) between the angular velocity command ωc and the angular velocity feedback value ωfb to the angular velocity controller 547.

The angular velocity controller 547 performs predetermined calculation processing including integration, using the deviation input from the subtractor 537, a proportional gain that is a predetermined factor, an integration gain, or the like, thereby generating a driving signal (driving current) of the first drive source 401 according to the deviation and supplying the driving signal to the motor 401M via the motor driver 301. In addition, in the present embodiment, the PI control is performed as the feedback control. However, the feedback control is not limited to this.

In this way, the feedback control is performed and the driving current of the first drive source 401 is controlled so that the position feedback value Pfb is as equal to the position command Pc as possible and the angular velocity feedback value ωfb is as equal to the angular velocity command ωc as possible.

Next, the angular velocity feedback value ωfb in the first drive source controller 201 will be described.

First, the first drive source controller 201 selects, according to the angle θ of the second arm 13, a case where the switches 637 and 647 are switched so that the angular velocity ωA2, an angular velocity ωA1m, and the angular velocity ωA2m to be described below are input to the adder-subtractor 627 and a case where the switches 637 and 647 are switched so that the angular velocity ωA1 and the angular velocity ωA1m to be described below are input.

That is, when the angle θ is equal to or larger than the first threshold θ1 and equal to or smaller than the second threshold θ2 larger than the first threshold θ1, the second arm 13 is in a state (simply referred to as an "extended state" or an "extended posture") where the second arm 13 is extended or slightly curved with respect to the first arm 12. In this case, the first drive source controller 201 selects the second inertia sensor 32 as the inertia sensor to be used. Then, the first drive source controller 201 switches the switches 637 and 647 so that the angular velocity ωA2, the angular velocity ωA1m, and the angular velocity ωA2m are input to the adder-subtractor 627. In addition, the first threshold θ1 is the same as that of the first embodiment.

Additionally, when the angle θ is smaller than the first threshold θ1 or larger than the second threshold θ2, the second arm 13 is in a state (hereinafter simply referred to as a "folded state" or a "folded posture") where the second arm is largely curved with respect to the first arm 12. In this case, the first drive source controller 201 selects the first inertia sensor 31 as the inertia sensor to be used. Then, the first drive source controller 201 switches the switches 637 and 647 so that the angular velocity ωA1 and the angular velocity ωA1m are input to the adder-subtractor 627. In addition, the second threshold θ2 is the same as that of the first embodiment.

Accordingly, the compatibility between enhancing the effect of suppressing vibration and the stability of control can be achieved.

First, a case where the angle θ of the first arm 12 is smaller than the first threshold θ1 or larger than the second threshold θ2 will be described.

In this case, in the angular velocity calculator 567, an angular velocity ωm1 of the first drive source 401 is calculated on the basis of the frequency of a pulse signal input from the first angle sensor 411, and the angular velocity ωm1 is output to the adder 607.

Additionally, in the angular velocity calculator 567, an angular velocity ωA1m of the first arm 12 around the rotation axis O1 is calculated on the basis of the frequency of the pulse signal input from the first angle sensor 411, and the angular velocity ωA1m is output to the adder-subtractor 627. In addition, the angular velocity ωA1m is a value obtained by dividing the angular velocity ωm1 by a reduction ratio between the motor 401M of the first drive source 401 and the first arm 12, that is, in the joint 171.

Additionally, the angular velocity of the first arm 12 around the rotation axis O1 is detected by the first inertia sensor 31. A detection signal of the first inertia sensor 31, that is, an angular velocity ωA1 of the first arm 12 around the rotation axis O1 detected by the first inertia sensor 31 is output to the adder-subtractor 627.

The angular velocity ωA1 and the angular velocity ωA1m are input to the adder-subtractor 627, and the adder-subtractor 627 outputs a value ωA1s (=ωA1−ωA1m) obtained by subtracting the angular velocity ωA1m from the angular velocity ωA1 to the converter 587. The value ωA1s is equivalent to a vibration component (vibration angular velocity) of the angular velocity of the first arm 12 around the rotation axis O1. Hereinafter, ωA1s is referred to as a vibration angular velocity. In the present embodiment, a feedback control is performed in which the vibration angular velocity ωA1s (in detail, an angular velocity ωm1s in the motor 401M that is a value generated on the basis of the vibration angular velocity ωA1s) is multiplied by a gain Ka to be described below and is returned to the input side of the first drive source 401. Specifically, a feedback control is performed on the first drive source 401 so that the vibration angular velocity ωA1s becomes as close to 0 as possible. Accordingly, the vibration in the robot 1 can be suppressed. In addition, the angular velocity of the first drive source 401 is controlled in the feedback control.

The converter 587 converts the vibration angular velocity ωA1s into the angular velocity ωm1s in the first drive source 401, and outputs the angular velocity ωm1s to the correction value calculator 597. This conversion can be obtained by multiplying the vibration angular velocity ωA1s by the reduction ratio between the motor 401M of the first drive source 401 and the first arm 12, that is, in the joint 171.

The correction value calculator 597 multiplies the angular velocity ωm1s by a gain (feedback gain) Ka that is a predetermined factor, obtains a correction value (second (B) correction component) Ka·ωm1s, and outputs the correction value Ka·ωm1s to the adder 607.

The angular velocity ωm1 and the correction value Ka·ωm1s are input to the adder 607. The adder 607 outputs an additional value of the angular velocity ωm1 and the correction value Ka·ωm1s to the subtractor 537 as the angular velocity feedback value ωfb. In addition, the subsequent operation is as mentioned above.

Next, a case where the angle θ of the second arm 13 is equal to or larger than the first threshold θ1 and smaller than the second threshold θ2 will be described.

In this case, in the angular velocity calculator 567, an angular velocity ωm1 of the first drive source 401 is calculated on the basis of the frequency of a pulse signal input from the first angle sensor 411, and the angular velocity ωm1 is output to the adder 607.

Additionally, in the angular velocity calculator 567, an angular velocity ωA1m of the first arm 12 around the rotation axis O1 is calculated on the basis of the frequency of the pulse signal input from the first angle sensor 411, and the angular velocity ωA1m is output to the adder-subtractor 627. In addition, the angular velocity ωA1m is a value obtained by dividing the angular velocity ωm1 by a reduction ratio between the motor 401M of the first drive source 401 and the first arm 12, that is, in the joint 171.

Additionally, in the angular velocity calculator 568 of the second drive source controller 202, an angular velocity ωA2m of the second arm 13 around the rotation axis O2 is calculated on the basis of the frequency of the pulse signal input from the second angle sensor 412, and the angular velocity ωA2m is output to the adder-subtractor 627. In addition, the angular velocity ωA2m is a value obtained by dividing the angular velocity ωm2 of the second drive source 402 calculated on the basis of the frequency of the pulse signal input from the second angle sensor 412 by a reduction ratio between the motor 402M of the second drive source 402 and the second arm 13, that is, in the joint 172.

Additionally, the angular velocity of the second arm 13 around the rotation axis O1 is detected by the second inertia sensor 32. A detection signal of the second inertia sensor 32, that is, an angular velocity ωA2 of the second arm 13 around the rotation axis O1 detected by the second inertia sensor 32 is output to the adder-subtractor 627.

The angular velocity ωA2, the angular velocity ωA1m, and the angular velocity ωA2m are input to the adder-subtractor 627, and the adder-subtractor 627 outputs a value ωA1s (=ωA2−ωA1m−A2m) obtained by subtracting the angular velocity ωA1m and the angular velocity ωA2m from the angular velocity ωA2 to the converter 587. The value ωA1s is equivalent to a vibration component (vibration angular velocity) of the total angular velocity of the first arm 12 and the second arm 13 around the rotation axis O1. Hereinafter, ωA1s is referred to as a vibration angular velocity. In the present embodiment, a feedback control is performed in which the vibration angular velocity ωA1s (in detail, an angular velocity ωm1s in the first drive source 401 that is a value generated on the basis of the vibration angular velocity ωA1s) is multiplied by a gain Ka and is returned to the input side of the first drive source 401 as a first (A) correction component. Specifically, a feedback control is performed on the first drive source 401 so that the vibration angular velocity ωA1s becomes as close to 0 as possible. Accordingly, the vibration in the robot 1 can be suppressed. In addition, the angular velocity of the first drive source 401 is controlled in the feedback control. The subsequent operation is as mentioned above.

In addition to a position command Pc of the second drive source 402, detection signals are input from the second angle sensor 412, the first inertia sensor 31, and the second inertia sensor 32, respectively, to the second drive source controller 202. The second drive source controller 202 drives the second drive source 402 by a feedback control using the respective detection signals so that a rotation angle (position feedback value Pfb) of the second drive source 402 calculated from the detection signal of the second angle sensor 412 becomes the position command Pc and an angular velocity feedback value ωfb to be described below becomes an angular velocity command ωc to be described below.

That is, the position command Pc is input to the subtractor 518 of the second drive source controller 202, and the position feedback value Pfb to be described below is input from the rotation angle calculator 558. In the rotation angle calculator 558, the number of pulses input from the second angle sensor 412 is counted, and the rotation angle of the second drive source 402 according to the counted value is output to the subtractor 518 as the position feedback value Pfb. The subtractor 518 outputs a deviation (value obtained by subtracting the position feedback value Pfb from a targeted value of the rotation angle of the second drive source 402) between the position command Pc and the position feedback value Pfb to the position controller 528.

The position controller 528 performs predetermined calculation processing using the deviation input from the subtractor 518 and a proportional gain that is a predetermined factor, and calculates the targeted value of the angular velocity of the second drive source 402 according to the deviation. The position controller 528 outputs a signal showing the targeted value (command value) of the angular velocity of the second drive source 402 to the subtractor 538 as the angular velocity command (third angular velocity command) $\omega c$. In addition, in the present embodiment, a proportional control (P control) is performed as the feedback control. However, the feedback control is not limited to this.

The angular velocity command $\omega c$ and the angular velocity feedback value $\omega fb$ to be described below are input to the subtractor 538. The subtractor 538 outputs a deviation (value obtained by subtracting the angular velocity feedback value $\omega fb$ from the targeted value of the angular velocity of the second drive source 402) between the angular velocity command $\omega c$ and the angular velocity feedback value $\omega fb$ to the angular velocity controller 548.

The angular velocity controller 548 performs predetermined calculation processing including integration, using the deviation input from the subtractor 538, a proportional gain that is a predetermined factor, an integration gain, or the like, thereby generating a driving signal (driving current) of the second drive source 402 according to the deviation and supplying the driving signal to the motor of the second drive source 402 via the motor driver 302. In addition, in the present embodiment, the PI control is performed as the feedback control. However, the feedback control is not limited to this.

In this way, the feedback control is performed and the driving current of the second drive source 402 is controlled so that the position feedback value Pfb is as equal to the position command Pc as possible and the angular velocity feedback value $\omega fb$ is as equal to the angular velocity command $\omega c$ as possible.

Next, the angular velocity feedback value $\omega fb$ in the second drive source controller 202 will be described.

In an angular velocity calculator 568, an angular velocity $\omega 2$ of the second drive source 402 is calculated on the basis of the frequency of a pulse signal input from the second angle sensor 412, and the angular velocity $\omega m2$ is output to an adder 608.

Additionally, in the angular velocity calculator 568, the angular velocity $\omega A2m$ of the second arm 13 around the rotation axis O2 is calculated on the basis of the frequency of the pulse signal input from the second angle sensor 412, and the angular velocity $\omega A2m$ is output to the adder-subtractor 618. In addition, the angular velocity $\omega A2m$ is a value obtained by dividing the angular velocity $\omega m2$ by a reduction ratio between the motor 402M of the second drive source 402 and the second arm 13, that is, in the joint 172.

Additionally, the angular velocity of the second arm 13 around the rotation axis O2 is detected by the second inertia sensor 32. A detection signal of the second inertia sensor 32, that is, an angular velocity $\omega A2$ of the second arm 13 around the rotation axis O1 detected by the second inertia sensor 32 is output to the adder-subtractor 618.

Additionally, the aforementioned detection signal of the first inertia sensor 31, that is, the angular velocity $\omega A1$ of the first arm 12 around the rotation axis O1 detected by the first inertia sensor 31 is output to the adder-subtractor 618.

The angular velocity $\omega A2$, the angular velocity $\omega A1$, and the angular velocity $\omega A2m$ are input to the adder-subtractor 618, and the adder-subtractor 618 outputs a value $\omega A2s$ ($=\omega A2-\omega A1-\omega A2m$) obtained by subtracting the angular velocity $\omega A1$ and the angular velocity $\omega A2m$ from the angular velocity $\omega A2$ to the converter 588. The value $\omega A2s$ is equivalent to a vibration component (vibration angular velocity) of the angular velocity of the second arm 13 around the rotation axis O2. Hereinafter, $\omega A2s$ is referred to as a vibration angular velocity. In the present embodiment, a feedback control is performed in which the vibration angular velocity $\omega A2s$ (in detail, an angular velocity $\omega m2s$ in the motor 402M that is a value generated on the basis of the vibration angular velocity $\omega A2s$) is multiplied by a gain Ka to be described below and is returned to the input side of the second drive source 402. Specifically, a feedback control is performed on the second drive source 402 so that the vibration angular velocity $\omega A2s$ becomes as close to 0 as possible. Accordingly, the vibration in the robot 1 can be suppressed. In addition, the angular velocity of the second drive source 402 is controlled in the feedback control.

The converter 588 converts the vibration angular velocity $\omega A2s$ into the angular velocity $\omega m2s$ in the second drive source 402, and outputs the angular velocity $\omega m2s$ to the correction value calculator 598. This conversion can be obtained by multiplying the vibration angular velocity $\omega A2s$ by the reduction ratio between the motor 402M of the second drive source 402 and the second arm 13, that is, in the joint 172.

The correction value calculator 598 multiplies the angular velocity $\omega m2s$ by a gain (feedback gain) Ka that is a predetermined factor, obtains a correction value (second correction component) Ka·$\omega m2s$, and outputs the correction value Ka·$\omega m2s$ to the adder 608. In addition, the gain Ka in the second drive source controller 202 and the gain Ka in the first drive source controller 201 may be the same or may be different.

The angular velocity $\omega m2$ and the correction value Ka·$\omega m2s$ are input to the adder 608. The adder 608 outputs an additional value of the angular velocity $\omega m2$ and the correction value Ka·$\omega m2s$ to the subtractor 538 as the angular velocity feedback value $\omega fb$. The subsequent operation is as mentioned above.

According to the robot 1B, the same effects as the aforementioned first embodiment are obtained.

Fourth Embodiment

The fourth embodiment will be described below mainly regarding differences from the aforementioned second and third embodiments, and the description of the same matters will be omitted.

In the robot 1 of the fourth embodiment, the first drive source controller 201 selects the inertia sensor to be used for the control of the operation of the first drive source 401 for suppressing the vibration in the arm 12 by taking into consideration tip load mass at the tip portion of the robot 1, that is, at a lower end portion (tip portion) of the mount 191 of the shaft 19 in addition to the angle θ of the second arm 13. That is, the first drive source controller 201 selects any one of the first inertia sensor 31 and the second inertia sensor 32 by taking into consideration the tip load mass, and controls the operation of the first drive source 401 using a detection result of the selected inertia sensor.

Specifically, in the present embodiment, the first drive source controller 201 adjusts the first threshold θ1 and the second threshold θ2 (θ2>θ1), respectively, on the basis of tip load mass in the feedback control of the first drive source 401.

In this case, as the tip load mass is larger, the first threshold θ1 is set to be larger and the second threshold θ2 is set to be smaller.

In addition, the tip load mass is the total mass of a functional portion (end effector) mounted on the mount 191 of the shaft 19 and an object to be gripped by the functional portion, similar to the second embodiment.

According to the robot 1, the same effects as the aforementioned second and third embodiment are obtained.

Although the robot of the invention has been described on the basis of the illustrated embodiments, the invention is not limited to this, and the configurations of the respective portions can be replaced with arbitrary configurations having the same functions. Additionally, other arbitrary structures may be added to the invention.

Additionally, the invention may be provided from the combination of two or more arbitrary configurations (features) among the respective embodiments.

In addition, the motors of the respective drive sources include, for example, stepping motors or the like in addition to the servo motors, respectively.

Additionally, in the above embodiments, the encoders are used as the respective angle sensors, respectively. However, the invention is not limited to these. For example, other various sensors, such as resolvers or potentiometers, which detect the rotation angles of rotor of the motors, may be used, and various sensors, such as tachogenerators, which detect the rotating speed of the rotors of the motors, may be used. In addition, when the stepping motors are used as the motor, the rotation angle or rotating speed of the rotors of the motors may be detected, for example, by measuring the number of driving pulses input to the stepping motors.

Additionally, in the above embodiments, the gyroscope sensors are used as the respective inertia sensors, respectively. However, the invention is not limited to these. For example, other various angular velocity sensors that detect the angular velocity of the arms may be used, and various acceleration sensors that detect the acceleration of the arms may be used. In addition, when the acceleration sensors are used, angular velocity is calculated using the detection values of the acceleration sensors.

Additionally, the types of the respective angle sensors and the respective inertia sensors are not particularly limited, and include, for example, an optical type, a magnetic type, an electromagnetic type, an electric type, or the like.

Additionally, in the above embodiments, the number of rotation axes of the robot is two or six. However, the invention is not limited to this, and the number of rotation axes of the robot may be three, four, five, or seven or more.

That is, in the above first embodiment, the number of arms of the robot is six because there are two arms attached to the wrist. However, the invention is not limited to this, and the number of arms of the robot may be two, three, four, five, or seven or more.

Similarly, in the above second embodiment, the number of arms of the robot is two. However, the invention is not limited to this, and the number of arms of the robot may be three or more.

Figure 15:
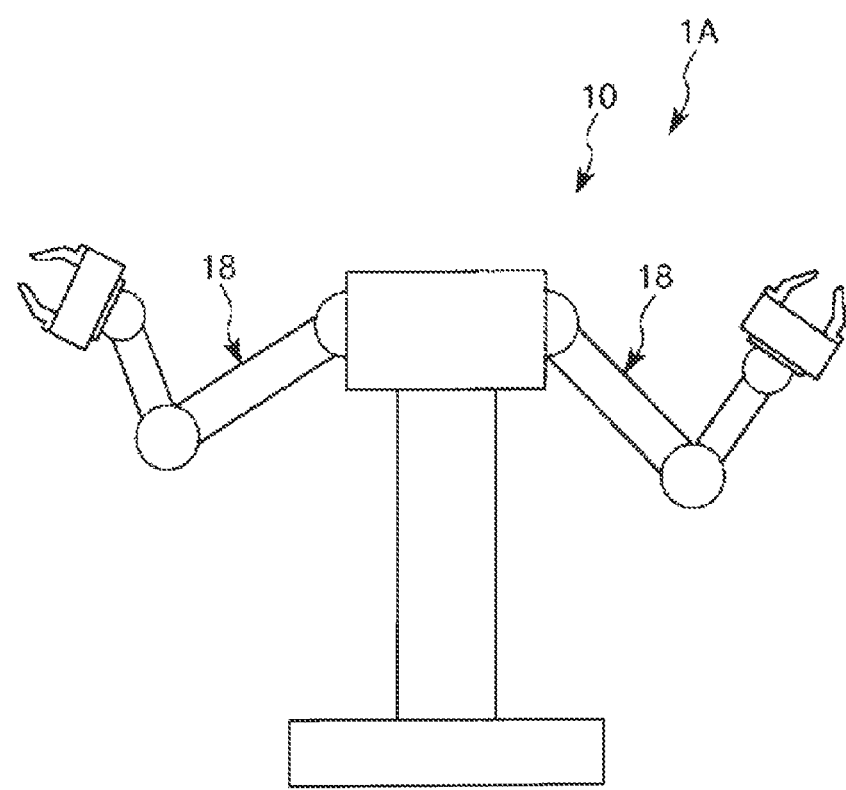
FIG. 15 is a front view showing another configuration example of the robot of the invention.

Additionally, in the above embodiments, the robot is a single arm robot that has one arm coupling body obtained by rotatably coupling a plurality of arms. However, the invention is not limited to this. For example, as shown in FIG. 15, robots having a plurality of the arm coupling bodies, such as a double-arm robot 1A having the two arm coupling bodies 18 each obtained by rotatably coupling a plurality of arms, may be used.

Additionally, in the above embodiments, the manipulator is detachably mounted on the wrist as the functional portion (end effector). However, the invention is not limited to this, and the functional portion includes a drill, a welder, a laser irradiation machine, or the like in addition to this manipulator.

Additionally, in the above embodiments, the angle detection unit that detects the angle θ formed between the axis of the first present arm and the axis of the second arm or the angle detection unit that detects the angle θ between the axis of the second present arm and the axis of the third arm is used as the posture detection unit. However, the invention is not limited to this. Besides, the posture detection unit includes a unit that acquires the targeted values (command values) of the rotation angle of the drive sources. The posture detection unit, for example, obtains an angle θ in the following control cycle on the basis of the targeted value of the rotation angle of a drive source in the following control cycle and the current angle θ. In this case, an inertia sensor to be used is selected on the basis of the angle θ in the following control cycle.

Additionally, for example, the inertia sensor to be used is selected on the basis of the current position of a tip portion of an arm, the command value of the position of the tip portion of the arm in the following control cycle, the current position of the tip portion of the wrist of the robot that is an arm closest to the tip side, the command value of the position of the tip portion of the wrist in the following control cycle, the current position of the lower end portion (tip portion) of the shaft, the command value of the position of the lower end portion (tip portion) of the shaft in the following control cycle, or the like.

The entire disclosure of Japanese Patent Application No. 2012-191452 filed Aug. 31, 2012 is expressly incorporated by reference herein.

What is claimed is:

1. A robot comprising:
   a base;
   a first arm that is coupled to the base and rotates with a first rotation axis as an axial center;
   a second arm that is coupled to the first arm and rotates with a second rotation axis in a direction different from the first rotation axis as an axial center;
   a third arm that rotates with a third rotation axis in a direction parallel to the second rotation axis as an axial center;
   a first drive source that rotates the first arm through a first angular velocity command;
   a first inertia sensor that is installed at the first arm and detects the angular velocity or acceleration of the first rotation axis of the first arm;
   a first angle sensor that detects the rotation angle of the first drive source;
   a second drive source that rotates the second arm through a second angular velocity command;
   a second inertia sensor that is installed at the second arm and detects the angular velocity or acceleration of the second rotation axis of the second arm;
   a second angle sensor that detects the rotation angle of the second drive source;
   a third drive source that rotates the third arm through a third angular velocity command;
   a third inertia sensor that is installed at the third arm and detects the angular velocity or acceleration of the second rotation axis of the third arm;
   a third angle sensor that detects the rotation angle of the third drive source;
   a posture detection unit that detects the posture of the third arm from the second arm as a reference point;

a first drive source control unit that feeds back a first correction component, which is derived from an angular velocity ωA1 of the first rotation axis of the first arm obtained from the first inertia sensor and an angular velocity ωA1m of the first rotation axis of the first arm obtained from the first angle sensor, and controls the first drive source; and a second drive source control unit that selects, on the basis of a detection result of the posture detection unit, any one of a second (A) correction component, which is derived from an angular velocity ωA3 of the second rotation axis of the third arm obtained from the third inertia sensor, an angular velocity ωA2m of the second rotation axis of the second arm obtained from the second angle sensor, and an angular velocity ωA3m of the third rotation axis of the third arm obtained from the third angle sensor, and a second (B) correction component, which is derived from an angular velocity ωA2 of the second rotation axis of the second arm obtained from the second inertia sensor and the angular velocity ωA2m, and feeds back the selected correction component to control the second drive source.

2. The robot according to claim 1, further comprising:
the first drive source control unit that feeds back the first correction component obtained by multiplying a value, which is obtained by subtracting the angular velocity ωA1m from the angular velocity ωA1, or a value derived from the obtained value, by a feedback gain, and control the first drive source; and a second drive source control unit that controls the second drive source according to any one of feeding back the second (A) correction component, which is obtained by multiplying a value, which is obtained by subtracting the angular velocity ωA2m and the angular velocity ωA3m from the angular velocity ωA3, or a value derived from the obtained value, by a feedback gain, and of feeding back the second (B) correction component, which is obtained by multiplying a value, which is obtained by subtracting the angular velocity ωA2m from the angular velocity ωA2, or a value derived from the obtained value, by a feedback gain.

3. The robot according to claim 1, further comprising:
the posture detection unit that detects the angle θ formed between an axis of the second arm and an axis of the third arm; and
the second drive source control unit that feeds back the second (A) correction component to control the second drive source when the angle θ is equal to or larger than a first threshold and equal to or smaller than a second threshold that is larger than the first threshold and that feeds back the second (B) correction component to control the second drive source when the angle θ is larger than the second threshold or smaller than the first threshold.

4. The robot according to claim 3, wherein the first threshold is within a range of 60° to 150°, and the second threshold is within a range of 210° to 300°.

5. The robot according to claim 3, further comprising:
the second drive source control unit that makes the first threshold large and makes the second threshold small as the mass of an end effector or the mass of the end effector and an object to be gripped by the end effector is larger.

6. The robot according to claim 1, further comprising:
the second drive source control unit that selects any one of the second (A) correction component and the second (B) correction component by taking into consideration the mass of an end effector or the mass of the end effector and an object to be gripped by the end effector.

7. The robot according to claim 1, further comprising:
the posture detection unit including the third angle sensor that detects the rotation angle of the third drive source.

8. The robot according to claim 1, further comprising:
the third drive source control unit that feeds back a third correction component, which is derived from an angular velocity ωA3 of the second rotation axis of the third arm obtained from the third inertia sensor, an angular velocity ωA2 of the second rotation axis of the second arm obtained from the second inertia sensor, and an angular velocity ωA3m of the third rotation axis of the third arm obtained from the third angle sensor, and controls the third drive source.

9. The robot according to claim 8, further comprising:
the third drive source control unit that feeds back the third correction component, which is obtained by multiplying a value, which is obtained by subtracting the angular velocity ωA2 and the angular velocity ωA3m from the angular velocity ωA3, or a value derived from the obtained value, by a feedback gain, and controls the third drive source.

10. The robot according to claim 1, further comprising: the first inertia sensor installed at a tip portion of the first arm, the second inertia sensor installed at a tip portion of the second arm, and the third inertia sensor installed at a tip portion of the third arm.

11. The robot according to claim 1, further comprising:
the second rotation axis that is orthogonal to the first rotation axis or parallel to an axis orthogonal to the first rotation axis.

12. A robot comprising:
a base;
a first arm that is rotatably coupled to the base with a first rotation axis as a rotation center;
a second arm that is rotatably coupled to the first arm with a second rotation axis in a direction parallel to the first rotation axis as a rotation center;
a first drive source that rotates the first arm through a first angular velocity command;
a first inertia sensor that is installed at the first arm and detects the angular velocity or acceleration of the first rotation axis of the first arm;
a first angle sensor that detects the rotation angle of the first drive source;
a second drive source that rotates the second arm through a second angular velocity command;
a second inertia sensor that is installed at the second arm and detects the angular velocity or acceleration of the second rotation axis of the second arm;
a second angle sensor that detects the rotation angle of the second drive source;
a posture detection unit that detects the posture of the second arm from the first arm as a reference point; and
a first drive source control unit that selects, on the basis of a detection result of the posture detection unit, any one of feeding back a first (A) correction component, which is derived from an angular velocity ωA2 of the first rotation axis of the second arm obtained from the second inertia sensor, an angular velocity ωA1m of the first rotation axis of the first arm obtained from the first angle sensor, and an angular velocity ωA2m of the second rotation axis of the second arm obtained from the second angle sensor, and controlling the first drive source, and of feeding back a first (B) correction component, which is derived from an angular velocity ωA1 of the first rotation axis of the first arm obtained from the first inertia sensor and an angular velocity ωA1m of the first rotation axis of the first arm obtained from the first angle sensor, and controlling the first drive source, and performs the selected controlling.

13. The robot according to claim 12, further comprising:
the first drive source control unit that selects, on the basis of a detection result of the posture detection unit, any one of feeding back the first (A) correction component, which is obtained by multiplying a value, which is obtained by subtracting the angular velocity ωA1m and the angular velocity ωA2m from the angular velocity ωA2, or a value derived from the obtained value, by a feedback gain, and controlling the first drive source and of feeding back the first (B) correction component, which is obtained by multiplying a value, which is obtained by subtracting the angular velocity ωA1m from the angular velocity ωA1, or a value derived from the obtained value, by a feedback gain and controlling the first drive source, and performs the selected controlling.

14. The robot according to claim 12, further comprising:
the posture detection unit that detects the angle θ formed between the axis of the first arm and the axis of the second arm; and
the first drive source control unit that feeds back a first (A) correction component, which is derived from an angular velocity ωA2 of the first rotation axis of the second arm obtained from the second inertia sensor, an angular velocity ωA1m of the first rotation axis of the first arm obtained from the first angle sensor, and an angular velocity ωA2m of the second rotation axis of the second arm obtained from the second angle sensor, and controls the first drive source, when the angle θ is equal to or larger than a first threshold and equal to or smaller than a second threshold that is larger than the first threshold, and that feeds back a first (B) correction component, which is derived from an angular velocity ωA1 of the first rotation axis of the first arm obtained from the first inertia sensor and an angular velocity ωA1m of the first rotation axis of the first arm obtained from the first angle sensor, and controls the first drive source when the angle θ is smaller than the first threshold or larger than the second threshold.

15. The robot according to claim 14, wherein the first threshold is within a range of 60° to 150°, and the second threshold is within a range of 210° to 300°.

16. The robot according to claim 14, further comprising:
the first drive source control unit that makes the first threshold large and makes the second threshold small as the mass of an end effector or the mass of the end effector and an object to be gripped by the end effector is larger.

17. The robot according to claim 12, further comprising:
the first drive source control unit that selects any one of the first (A) correction component and the first (B) correction component by taking into consideration the mass of an end effector or the mass of the end effector and an object to be gripped by the end effector.

18. The robot according to claim 12, further comprising:
the posture detection unit including the second angle sensor that detects the rotation angle of the second drive source.

19. The robot according to claim 12, further comprising:
the second drive source control unit that feeds back a second correction component, which is derived from an angular velocity ωA2 of the first rotation axis of the second arm obtained from the second inertia sensor, an angular velocity ωA1 of the first rotation axis of the first arm obtained from the first inertia sensor, and an angular velocity ωA2m of the second rotation axis of the second arm obtained from the second angle sensor, and controls the second drive source.

20. The robot according to claim 19, further comprising:
the second drive source control unit that feeds back the second correction component, which is obtained by multiplying a value, which is obtained by subtracting the angular velocity ωA1 and the angular velocity ωA2m from the angular velocity ωA2, or a value derived from the obtained value, by a feedback gain, and controls the second drive source.

* * * * *